United States Patent [19]
Kleimola

[11] 3,865,688
[45] Feb. 11, 1975

[54] PASSIVE CONTAINMENT SYSTEM

[76] Inventor: Frank W. Kleimola, 5008 Rimers Dr., Jackson, Mich. 49201

[22] Filed: Sept. 15, 1972

[21] Appl. No.: 289,726

Related U.S. Application Data
[63] Continuation-in-part of Ser. No. 61,063, Aug. 5, 1970, abandoned.

[52] U.S. Cl. .................................. 176/37, 176/38
[51] Int. Cl. ............................................. G21c 9/00
[58] Field of Search .......................... 176/37, 38, 87

[56] References Cited
UNITED STATES PATENTS

| | | | |
|---|---|---|---|
| 3,115,450 | 12/1963 | Schanz | 176/37 |
| 3,375,162 | 3/1968 | Wilson | 176/37 |
| 3,438,857 | 4/1969 | Sulzer | 176/37 |
| 3,580,806 | 5/1971 | Weems et al. | 176/37 |
| 3,649,451 | 3/1972 | Yedrdig et al. | 176/37 |
| 3,666,616 | 5/1972 | Schluderberg | 176/38 |
| 3,666,622 | 5/1972 | Schluderberg | 176/38 |
| 3,668,069 | 6/1972 | Ullrich et al. | 176/38 |
| 3,713,968 | 1/1973 | Kennedy et al. | 176/37 |

Primary Examiner—Harvey E. Behrend
Attorney, Agent, or Firm—Lon H. Romanski

[57] ABSTRACT

A containment system that provides complete protection entirely by passive means for the loss of coolant accident in a nuclear power plant and wherein all stored energy released in the coolant blowdown is contained and absorbed while the nuclear fuel is prevented from over-heating by a high containment back-pressure and a reactor vessel refill system. The primary containment vessel is restored to a high subatmospheric pressure within a few minutes after accident initiation and the decay heat is safely transferred to the environment while radiolytic hydrogen is contained by passive means.

22 Claims, 13 Drawing Figures

PASSIVE CONTAINMENT SYSTEM

This application is a continuation-in-part of my copending application Ser. No. 61,063, filed Aug. 5, 1970, now abandoned.

BACKGROUND OF THE INVENTION

1. FIELD OF THE INVENTION

Nuclear power plants are required by practice to be designed in such a manner that the health and safety of the public is assured even for the most adverse accidents that can be postulated. For plants utilizing light water as a coolant, the most adverse accident is considered to be a double-ended break of the largest pipe in the reactor coolant system and is termed the Loss of Coolant Accident (LOCA).

For accident protection, these plants utilize containment systems that are designed to physically contain water, steam, and any entrained fission products that may escape from the reactor coolant system. The containment system is normally considered to encompass all structures, systems and devices that provide ultimate reliability in complete protection for any accident that may occur. Engineered safety systems are specifically designed to mitigate the consequences of an accident. Basically, the design goal of a containment system is that no radioactive material escapes from the nuclear power plant in the event of an accident so that the lives of the surrounding populace are not endangered.

The passive containment system herein disclosed provides this level of protection for a loss of coolant accident and for the other types of accidents that are considered as a basis of design, and is considered to be effective for nuclear power plants employing either Pressurized Water Reactors or Boiling Water Reactors.

2. The Prior Art

Prior art techniques have utilized either full-pressure "dry type" containment or pressure suppression containment for light water cooled nuclear power plants.

In the full-pressure containment the reactor building, completely enclosing the reactor coolant system, is capable of withstanding the pressure and temperature rise expected from a LOCA. The building is typically constructed either of steel or steel-lined reinforced concrete or prestressed concrete.

Refinements of full-pressure containment include double leakage-control barriers and subatmospheric pressure operation. For the double leakage-control barrier any leakage into the control annulus is either pumped back into the primary containment, or the leakage is treated before being exhausted to the outside atmosphere. For subatmospheric operation the containment is normally maintained at partial vacuum, and following a LOCA, the pressure is reduced back to less than the outside atmosphere utilizing active engineered safety systems to terminate any potential release of radioactivity to the environment.

The pressure-suppression containment consists of a drywell that houses the reactor coolant system, a pressure suppression chamber containing a pool of water, and a vent system connecting the drywell to the pool of water. This containment structure is constructed of steel enclosed by reinforced concrete, or is steel-lined with reinforced concrete. The pressure-suppression containment is housed within a reactor building.

In the event of a LOCA, the reactor coolant partially flashes to steam within the drywell, and the air, steam, and liquid coolant flows through the connecting vents into the pool of water in the suppression chamber. The steam is condensed by the water and decreases the potential pressure rise in the containment. The air rises into the free space above the pool of water in the suppression chamber.

Refinements in pressure-suppression containment utilizing water includes the inerting of the containment atmosphere. Inerting is aimed at preventing the burning of hydrogen evolved from metal-water reactions of overheated nuclear fuel.

A different type of pressure suppression containment utilizes an ice-condenser. The ice is maintained in a refrigerated compartment surrounding the reactor coolant system. The ice-condenser containment is divided into an upper chamber and a lower chamber with the reactor coolant system in the latter. In the event of a LOCA a pressure rise of the lower chamber causes access panels located at the bottom of the ice-storage compartment to open. This provides a flow path for air and steam through the ice bed. The steam is condensed by the ice and decreases the potential pressure rise in the containment. The air passes into the upper chamber through top access panels forced open by the flow of air.

Full-pressure containment and pressure-suppression containment are passive structures that require support systems for accident containment. Active systems such as residual heat removal systems and containment spray systems are used to dissipate heat to the environs. This prevents the containment design pressure and temperature from being exceeded, and in the process, the containment pressure is reduced to limit the leakage of fission products. Active filtration systems are required in conjunction with the spray systems to reduce fission product concentration in the containment atmosphere. This also limits the amount of fission products that can leak out of the containment to the environs. Hydrogen recombiners are also being utilized to protect the containment from developing explosive concentrations of hydrogen.

To be effective, both the full-pressure containment and the pressure-suppression containment require additional engineered safety systems that provide emergency cooling of the nuclear fuel. Pressurized Water Reactors require passive accumulator systems in addition to active high and low pressure injection systems to maintain an adequate amount of liquid coolant at the nuclear fuel. The residual heat removal systems used for containment pressure reduction also reject decay heat to the environs.

Pressure suppression with gravity flooding has also been proposed as an engineered safety system for the LOCA.

Active engineered safety systems are inherently required to function effectively in order to maintain the integrity of the containment system in the LOCA. Active systems require high integrity instrumentation and control equipment, rotating machinery, electric power sources and power distribution equipment. These systems need to function properly as part of a larger system under adverse containment environment conditions of high pressure, high temperature, high humidity, high radioactivity, and eroded thermal insulation.

Malfunctioning of any active engineered safety system imposes even more adverse conditions on the operable system. For instance, an inadequate source of electric power may result in the malfunctioning of the emergency core cooling system for the nuclear fuel. Overheating of the fuel can result in melting of the fuel cladding with metal-water reactions occuring. The fuel core may slump and portions could collapse and overheat the bottom of the reactor vessel. Hydrogen is released from metal-water reactions and is subject to burning. The added energy from the metal-water reactions and from the burning of hydrogen imposes even more severe requirements on the containment structure. Overheating of the fuel and melting of the clad results in a gross release of fission products that are available for leakage out of the containment system. This example points to the critical nature of active engineered safety systems that are an essential part of the containment system of the prior art.

SUMMARY OF THE INVENTION

This invention relates to a nuclear reactor containment arrangement and relates more particularly to an entirely passive containment system which encloses a reactor system which uses a high pressure, high temperature coolant and/or moderator such as light or heavy water.

In the exemplary application of the invention, the passive containment system is used to safely contain even the most adverse reactor accident wherein a sudden rupture of the reactor piping occurs resulting in the loss of coolant accident (LOCA). The passive containment system herein provides equal protection for nuclear reactor systems of the pressurized water or boiling water types.

The passive containment system for the pressurized water reactor consists of interconnected cells; each cell houses a major component of the nuclear reactor system; i.e. reactor vessel, steam generators, pumps, pressurizer, regenerative heat exchanger, and piping. Within the containment cells a primary container formed from interconnected steel shells encloses the entire reactor coolant system. A secondary steel container immediately surrounds the primary container. The secondary in turn is encased by reinforced or prestressed concrete. An annulus between the primary and secondary containers is water-filled.

Deluge tanks and reactor vessel refill tanks are located entirely within the containment cells at an elevation above the reactor coolant system piping and are water-filled. Safety relief devices at the primary container and also at the secondary container discharge into a deep well.

The deep well surrounds the reactor vessel containment cell and extends downward below the reactor vessel. The steel-lined deep well containing coupling fluid is encased by reinforced concrete and/or prestressed concrete. Two separate sets of heat exchange units are submerged in the deep well and are separated by a flow baffle that extends virtually the full height of the deep well. One heat exchange unit opens into the reactor vessel cavity with the second heat exchange unit opening into an outdoor body of water. Heat exchange units are also utilized for the coupling fluid which fills the annulus between the primary and secondary containers. These heat exchange units are located within the outdoor body of water.

The water used within the reactor vessel refill tanks, within deluge tanks, within the annulus between the primary and secondary containers, and within the deep well is specially treated for accident containment purposes. The water is degassed and contains chemicals in solution that serve as a poison to neutrons, inhibitors of corrosion, oxygen "getters," and radio-nuclide getters. The water is retained in a chilled condition by steam-jet refrigeration systems or by heat exchanger units.

The passive containment system is normally housed within a reactor building. The arrangement of the cell structures permits the location of spent fuel storage pools and a refueling cavity within the reactor building. Heat exchange units at the spent fuel storage pools open to the outdoor body of water.

In a typical response of the passive containment system hereof to a LOCA, decompression of the reactor coolant through the pipe break produces steam within the primary container that is normally maintained at a high-vacuum. The steam pressurizes the container and at a preset pressure, bursts rupture disks at the deluge tanks. Steam carryover into the deluge tank ensues. The steam carryover and thermal expansion causes the deluge tanks to become "water-logged." With the tanks water-logged the confined volume of the primary container is increased in pressure until the coolant blowdown is arrested by the container backpressure. The primary container is designed so that the coolant blowdown is arrested by the container back-pressure with a sufficient amount of water still retained in the reactor vessel to keep the nuclear fuel effectively cooled.

Before the reactor coolant blowdown is terminated by the containment back pressure, the hydrostatic pressure within the reactor vessel refill tanks causes check valves at the interconnecting piping to lift, and treated water is injected into the reactor coolant system. The decompression of the refill tanks causes rupture disks to burst at the steam headers located between the steam generator secondaries and the refill tanks. The bursting of the disks initiates the flow of steam from the steam generators through jet injectors; steam flow through the injectors entrains treated water from the refill tanks. The steam and water are intimately mixed on passage through the diffuser section of the injector to provide a homogenous solution of treated water that refills the reactor vessel.

The chilled water in the elevated deluge tanks quenches the steam carryover during coolant blowdown as the container back-pressure increases to arrest the blowdown. With coolant blowdown arrested a gravity deluge of the chilled water with neutron poison in solution completely submerges the reactor piping and refills the reactor coolant system through the pipe break that resulted in loss of coolant. All stored energy within the reactor system is absorbed by the deluge water. Sufficient heat capacity is provided in the deluge water to reduce temperatures to low levels so that the primary container atmosphere is restored to the normal high-vacuum condition by the deluge. Any leakage from the primary container during the blowdown and deluge is absorbed by the water in the secondary container. Any over-pressure of the primary container during the blowdown is relieved to the water in the deep well.

The continued energy release as decay heat from the nuclear fuel is passively transferred to the environs by thermal conduction and natural convention. This heat is first transferred by convention from the fuel to the reactor coolant and then by conduction through the uninsulated metal walls of the reactor system to the deluge water in the primary container. Cooling pipes that connect to the heat exchange unit in the deep well transfer the heat by conduction and convection from the reactor vessel cavity to the water in the well. Thermal convection circulates the water in the deep well around the flow baffle and past the second heat exchange unit in the well. At the second heat exchange units, the decay heat in turn is conducted to water flowing through the tubes circulated by natural convention from an outdoor body of water.

Energy is also transferred passively to the outdoors via the secondary container water. Heat is conducted through the steel shell from the deluge water in the primary container to the water in the secondary container. The secondary water then flows by natural convection through heat exchange units located within an outdoor body of water. Water at the outdoor body circulates by thermal convection past the heat exchange units to absorb the heat from the secondary water.

The passive containment system arrangement permits the spent fuel storage pools and reactor auxiliary systems and components to be housed within the reactor building. This arrangement also lends itself to passive heat exchange circuits that are connected to heat exchange units located at the spent fuel storage pools and at the reactor auxiliary systems and components. These passive heat exchange units reject heat to the outdoor body of water.

OBJECTS OF THE INVENTION

It is therefore a general object of this invention to provide a new and improved containment method for any energy, toxic, or radioactive materials released from a process system accommodated therein.

It is a more particular object of the invention to provide a passive containment process and apparatus for a nuclear reactor assemblage.

Another object of this invention is to provide functional improvements in the complete containment of a nuclear reactor system through strictly passive means entirely actuated, controlled, powered and maintained by the forces in nature that are designed to be intrinsic to the containment system.

Still another object of this invention is to provide a reactor containment system that is less expensive to construct in that the primary containment free volume is effectively reduced, less expensive materials are required, and active safely systems currently used in reactor containment systems are eliminated.

Still another object of this invention is to provide a containment system that permits an improvement in the structural and equipment arrangements to provide compactness in design.

Still another object of this invention is to provide an absolutely reliable containment system for the nuclear reactor assemblage accommodated therein to permit greater freedom in the siting of nuclear power plants in order to substantially reduce the costs of supplying electric power to a metropolitan community.

Still another object of the invention is to provide a passive containment system that is compatible with the accidents that are the basis of design including the loss of coolant accident including a double-ended rupture of the largest pipe in the reactor coolant system.

Still another object of this invention is to provide a passive containment system that permits a structural and equipment arrangement that is compatible to withstanding the additional forces imposed by natural phenomena including snow and ice loads, hurricanes, tornadoes, flooding conditions such as tsunami and seiches, and earthquakes; and provides protection in depth to external missiles including airplane collisions.

Still another object of this invention is to provide a passive containment system that harnesses the forces of physics to provide the ultimate level of reliability in the containment of nuclear power plants.

Still another object of this invention is to provide passive emergency core cooling utilizing high containment back-pressure, reactor vessel refill, containment deluge, residual heat transfer, coupling fluids and an ultimate heat sink for the loss of coolant accident.

Still another object of this invention is to provide a containment system that permits full scale tests of the effectiveness of emergency core cooling in the loss of coolant accident.

A further object of this invention is to provide a containment system that permits plant recovery from all design basis accidents including the loss of coolant accident.

Description of Drawings.

These objects and other benefits derived from the invention will be more fully presented in the detailed description of an embodiment for a pressurized water reactor with reference to the following drawings in which:

FIG. 8 shows a typical piping arrangement for a refill tank. FIG. 9 shows the general arrangement of the refill tanks for a four loop pressurized water reactor system.

FIG. 10 compares the net free volume requirement to the peak accident pressure for a full pressure (dry-type) containment normally operated at (a) atmospheric pressure (14.7 psia). (b) high-vacuum (2. psia) and (c) full-vacuum (0 psia);

FIG. 11 compares the amount of reactor coolant retained in the liquid phase (total in reactor coolant system and primary containment) to the peak accident pressure (containment back-pressure) for a full-pressure (dry-type) containment; also the amount retained in the reactor vessel alone;

FIG. 12 compares the amount of reactor coolant retained in the liquid phase within the reactor vessel alone to the peak accident pressure (primary container back pressure) for a passive containment system with steam carryover into deluge tanks and the primary container net free volume in cubic feet set at (a) 100,000 (b) 75,000, (c) 50,000 and (d) 35,000;

FIG. 13 compares the primary container pressure after deluge to the mass of deluge fluid provided in the passive containment system stored at (a) 60°F, (b) 50°F and (c) 40°F; the primary container net free volume for this comparison is set at 35,000 cubic feet with the container pressure being maintained at 2.0 psia before the design basis accident.

DETAILED DESCRIPTION OF EMBODIMENT

Figure 1:
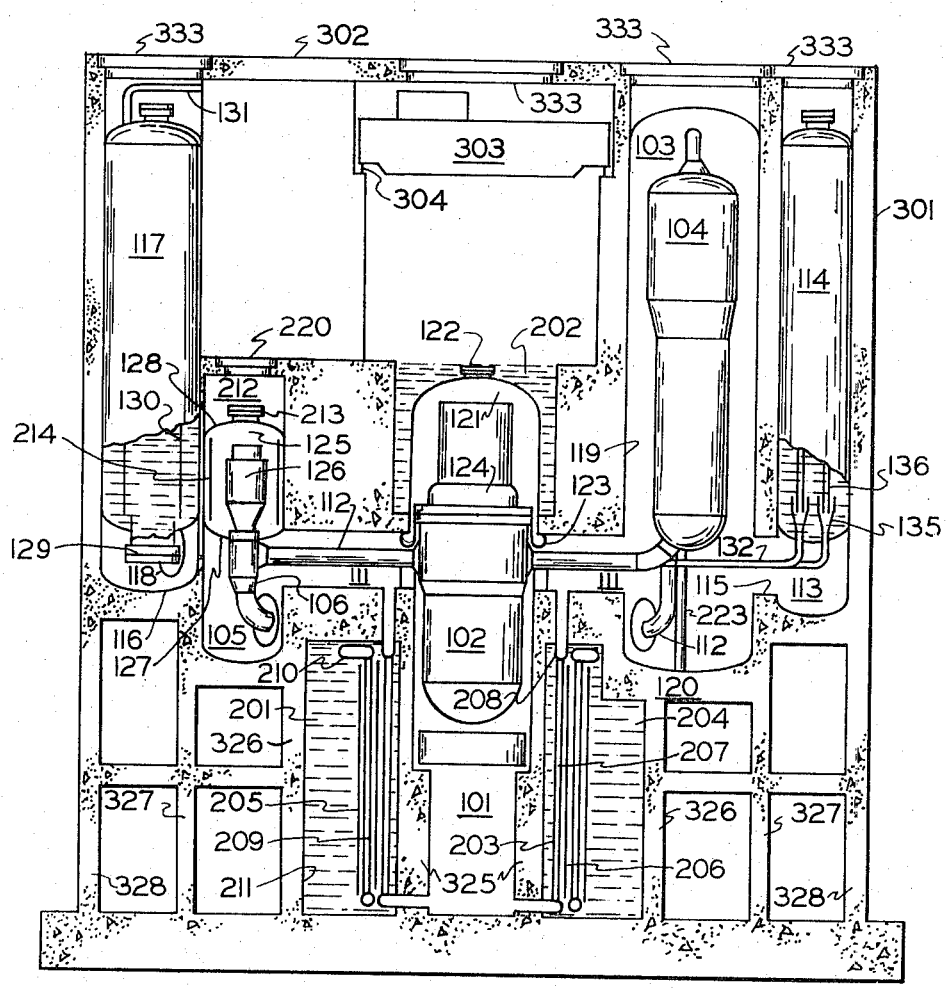
FIG. 1 is a vertical section of the reactor building arrangement for the passive containment system according to the invention and taken through a deluge tank cell, a reactor coolant pump cell, the reactor vessel cell, a steam generator cell, a refill tank cell, and interconnecting reactor coolant system piping cells substantially along reference line I—I of FIG. 4.
Figure 2:
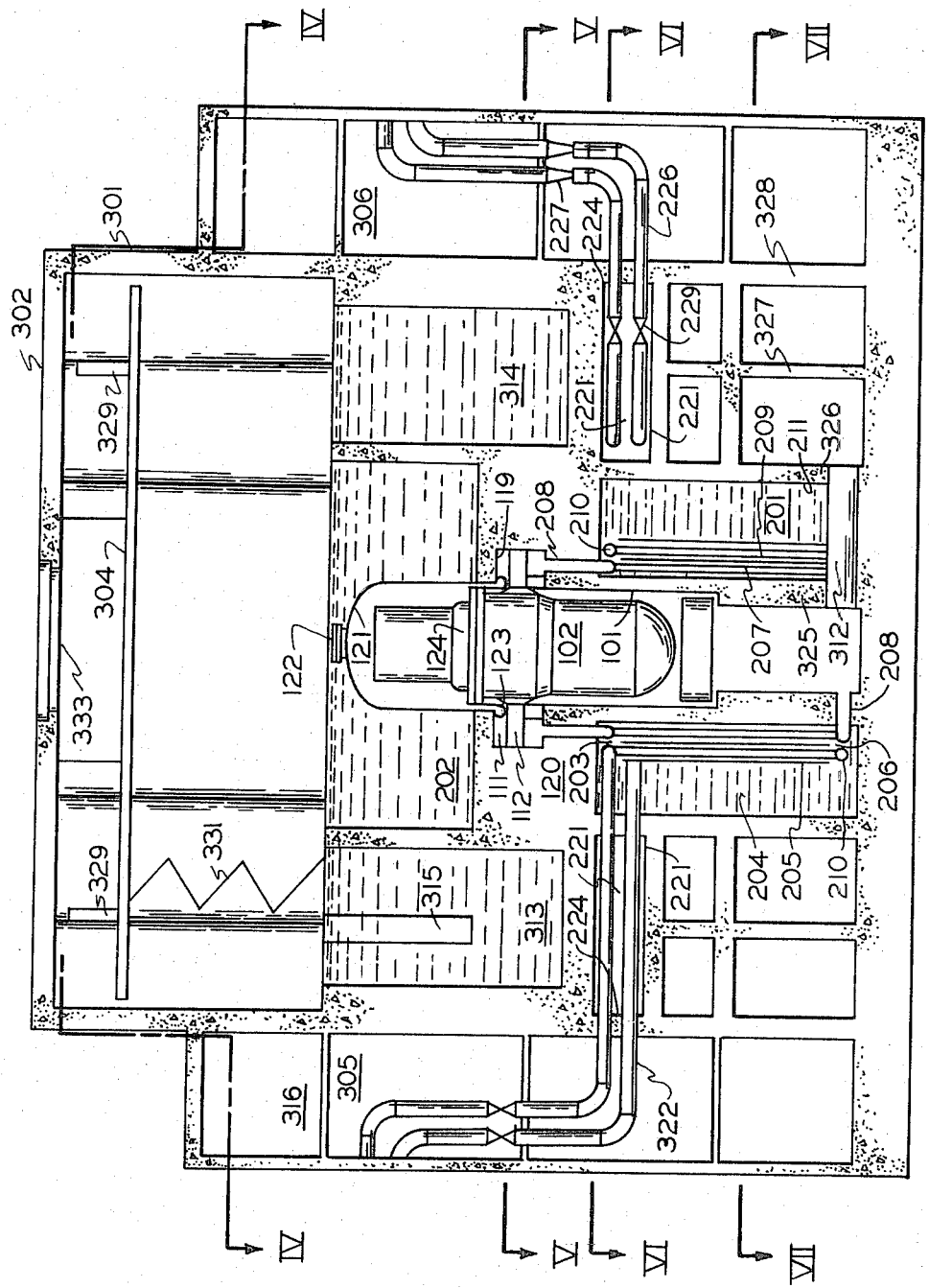
FIG. 2 is a vertical section of the reactor building arrangement and taken through the two spent fuel pools sandwiching the reactor refueling cavity substantially along reference line II—II of FIG. 4.
Figure 3:
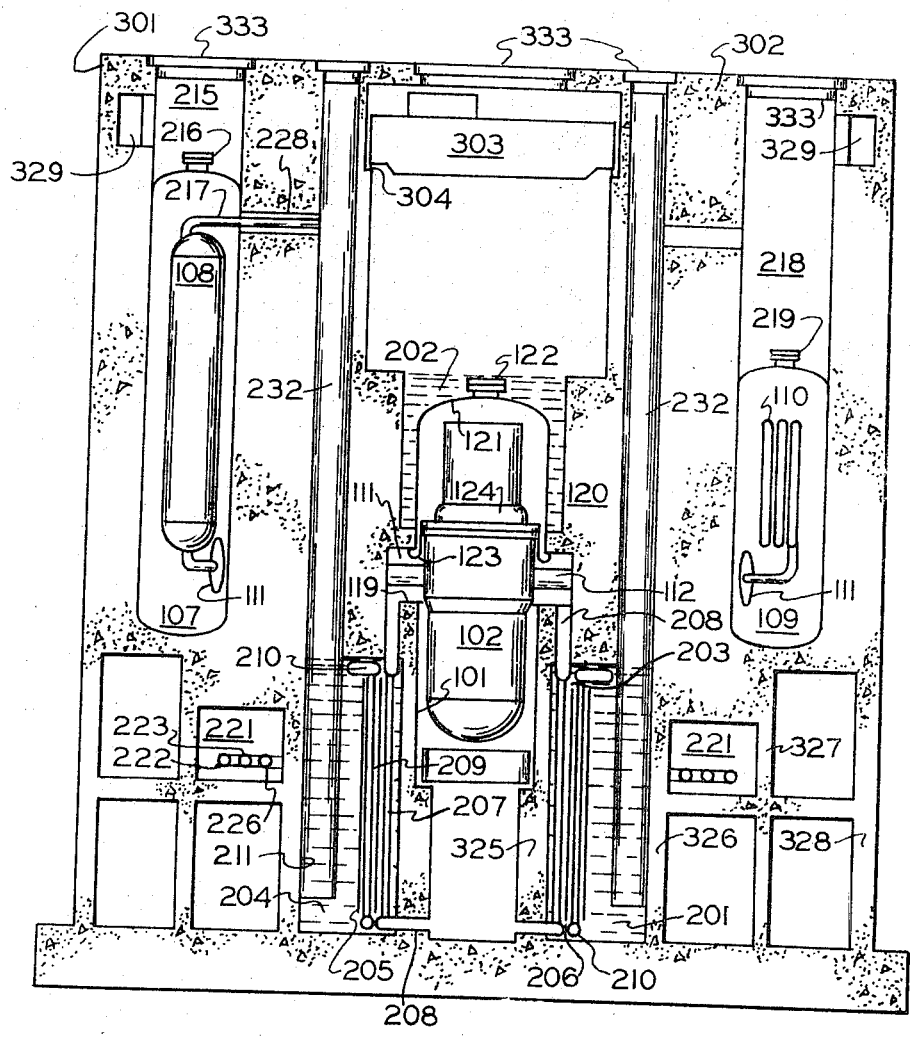
FIG. 3 is a vertical section of the reactor building arrangement and taken through the pressurizer cell, an access shaft, the reactor vessel cell, a second access shaft, and the regenerative heat exchanger cell substantially along reference line III—III of FIG. 4.

Referring now to the drawings a passive containment system for a four loop pressurized water reactor is revealed therein, as by FIGS. 1 through 7 inclusive. The primary containment consists of interconnected cells that enclose the reactor coolant system components. A reactor vessel cell 101 houses the reactor vessel 102. Each one of the four steam generator cells 103 encloses a steam generator 104. Four reactor coolant pump cells 105 each house a reactor coolant pump 106. A pressurizer cell 107 houses the pressurizer 108. A regenerative heat exchanger cell 109 encloses the high-pressure regenerative heat exchanger 110. Reactor coolant system piping cells 111 house the reactor coolant system piping 112.

Refill tank cells 113 contain the reactor vessel refill tanks 114. The bottom end of each refill tank cell is seal welded to a support skirt which is a part of the primary containment. The refill tank piping cells 115 in turn interconnect the support skirts to adjacent steam generator cells 103.

Deluge tank cells 116 house the deluge tanks 117. The bottom end of each deluge tank is seal welded to a support skirt which is part of the primary containment. The deluge tank piping cells 118 in turn interconnect the support skirts to adjacent steam generator cells 103.

The containment cells are constructed from steel and concrete. A continuous steel lining 119 provides form to the interconnected cells. Within the cells the free space permits access for the maintenance of reactor components. Internal stiffening rings are used on the cylindrical steel shells 119 to provide the required moment of inertia for the external pressure that is subjected into the cells that form the primary containment. Reinforcement rings are also used at the interconnections between the piping cells and the major equipment cells.

The reactor coolant system piping cells 111 provide ready means for the installation of piping supports and restraints that preclude damage to the primary containment and other components from the movement of a failed pipe (pipe whip) in the event of a LOCA. These pipe supports and restraints utilize a three point mount off the stiffening rings and the reinforcement rings at the primary containment steel liner 119 within the piping cells. The stiffening rings are also closely spaced providing added protection for the steel liner. Major components are protected against movement as in an earthquake by vessel stabilizers.

The steel lining 119 is of double-wall construction (not shown). The annular space between the steel plates is filled with water that has neutron poison in solution. The space enclosed by the inner plate forms the primary container for the reactor coolant system. During reactor operation at power this free space is maintained at a high-vacuum to thereby eliminate the need for thermal insulation at the exterior surfaces of the reactor coolant system. During reactor shutdown for maintenance operations, air at atmospheric pressure is circulated within the primary container utilizing the vacuum lines penetrating the primary container.

The elimination of thermal insulation at the surfaces of the reactor coolant system, the steam generator secondaries, and the auxiliary piping offers decided improvements over the prior containment art which does require thermal insulation at high and low temperature systems and component surfaces within the primary containment. These improvements include:

1. A reduction in the containment volume, in the construction time and in materials costs;
2. Elimination of a potential chloride stress corrosion problem introduced by the chloride impurities present in thermal insulation;
3. Permits continuous remote surveillance of the critical areas of the uncovered steel external surfaces at the reactor coolant piping, at the reactor vessel and at other major components;
4. A reduction in the radiation exposure time of plant personnel engaged in maintenance and inspection operations by eliminating the time required to remove and to reinstall the thermal insulation; and
5. Elimination of the hazards resulting from eroded insulation in the LOCA.

In the prior containment art the impinging jet stream from coolant blowdown in LOCA erodes the insulation and suspends it in water to clog spray nozzles and air filters in the containment spray and air recirculation systems, also to clog heat exchangers and pump inlet strainers in the emergency recirculation system for decay heat transfer.

The water-filled annulus between the primary and the secondary containment vessels provides a "water-jacket" that serves as a "cold-wall" for the primary container except at the containment penetrations. Leakage from the primary container is absorbed by the water within the secondary container. The spacing of plates at the cold-wall can vary from a few inches to a number of feet as required in the detail design of the passive containment system.

Most all primary containment cells are enclosed by a concrete structure 120, (either prestressed or reinforced as determined in the detail design) except at the top of the reactor vessel. A flanged dome 121 encloses the control rod drives. A flanged manhole 122 at the pressure container provids access to the control rod drives.

The concrete structure immediately encasing the secondary containment offers structural support for both the secondary and primary containment vessels and for the reactor coolant system housed therein. A sufficient thickness of structural concrete is provided throughout to also serve as biological shielding. Protection against penetrating radiation is thus provided to occupants within the reactor building for both normal reactor operation and for all accidents within the primaray containment including the LOCA.

A number of the primary containment cells are compartmented. The reactor vessel cell has two compartments; an upper and a lower. The upper compartment is formed by the flanged steel dome 121. The lower compartment houses the reactor vessel 102. The two compartments are isolated from each other by a steel diaphragm 123. For reactor refueling, with the reactor vessel flanged head 124 removed a seal ring is bolted into place to provide a second water-tight seal between the upper and lower compartments. This second seal (not shown) bridges the annular space between the reactor vessel flange and the containment steel liner at the reactor vessel cell 101.

Each one of the four reactor coolant pump cells 105 has two compartments; pump motor and pump casing. The free space immediately around the pump casings 106 forms the lower compartment. The motor compartments 125 house the pump motors 126. The motor compartments 125 can be supplied either with an air or inert gas atmosphere; at the same time the rest of the free space (free volume) in the primary containment can be maintained either at a high-vacuum or at atmospheric pressure.

The steel diaphragm 127 separates the pump cell into two compartments. The diaphragm is seal welded to the pump casing and to the cell liner to form the upper (motor) compartment 125.

The steel liner at the motor compartment is completely seal welded at the dished head 128. The head can be readily cut to provide for the replacement of a pump motor through the hatch opening located directly above the motor. After pump replacement the dished head is rewelded into place.

The four reactor vessel refill tanks 114 and the four deluge tanks 117 contain neutron poison in solution. The contents of the tanks are maintained at a low temperature utilizing mechanical refrigeration units. A sufficient amount of fluid is provided within any three refill tanks 114 to overflow the reactor vessel 102 on refill after a LOCA.

The deluge tanks 117 contain a sufficient amount of fluid to fill the primary containment free volume to an elevation above any primary coolant system pipe break. Rupture disks 129 are positioned at the bottom end of the deluge tanks 117. A length of pipe 130 is positioned immediately above the disk to serve as a diffuser to quench the steam with deluge fluid during steam carryover in a LOCA.

Relief valves are positioned on headers 131 leading from the top of the deluge tanks 117. Any overpressure discharge through the relief valves in a LOCA is directed into the deep well 201.

Drain lines with two isolation valves in series and a water seal system are provided at all low points at the primary containment; at the steam generator cells, at the reactor vessel cell in both lower and upper compartments, and at the reactor coolant pump cells in both the lower and upper compartments. These drain lines are all routed to a leak monitoring tank; the upper compartment of the pump cells drain to a separate tank. The two tanks in turn drain to radwaste storage.

These drain lines can be used for post-accident recovery from a LOCA. After all of the fuel is retrieved from the reactor vessel into the fuel storage pools, the deluge fluid flooding the primary containment is gradually drained through the leak monitoring tank and the fluid is processed by the liquid rad-waste system. With all of the deluge fluid drained, the internal steel surfaces of the primary containment can be sprayed utilizing the steam lines primarily provided to flush out the air atmosphere in preparation for normal reactor startup. Following a series of spary applications with decontaminating solutions to wash the potentially radioactive surfaces, limited entry can be made to complete the decontamination operations. After decontamination, the damage caused by the LOCA can be assessed and repairs made to recondition the plant for continued operation at power.

The deep well enclosure 201 is filled with highly borated water which has a boron concentration equivalent to that in the reactor coolant during refueling operations. On reactor shutdown for refueling, the borated water is pumped from the deep well into the reactor refueling cavity 202. After completion of the refueling operation the borated water is drained back into the deep well from the refueling cavity. The well has an inner zone 203 and an outer zone 204 that are separated by a concentric steel cylinder 205 that extends from near floor level to an elevation slightly below the operating level of the borated water. The outer zone serves as a heat sink for high-temperature fluid that is discharged directly into the deep well: i.e. overpressure blowdown from the reactor coolant system pressurizer, from the steam generators, from primary or secondary containment, or from secondary enclosures.

At the inner zone 203 of the deep well the borated water serves as a heat transfer media for the decay heat in the post-accident period following a LOCA. This heat is transferred by the borated water from the primary containment to the cooling pond. At the inner zone a steel baffle 206 separates the zone into two annular passages. Cooling pipes 207 are positioned at the inner passage are connected to headers 208 that are routed from the reactor coolant system piping cells and into the reactor vessel cell 101 lower compartment. The biological shield underneath the reactor vessel 102 is stepped and provided with a flow annulus. Cooling coils 209 positioned at the outer passage are connected to headers 210 that are routed to an outdoor cooling pond.

In a LOCA the reactor vessel cell 101 fills with the reactor coolant blowdown, refill tank fluid overflow and deluge tank fluid. Thermal circulation through the cooling pipes 207 transfers sensible heat to the borated water in the deep well. Thermal circulation of the well water in turn transfers the sensible heat to the cooling pond water theremally circulated through the cooling coils 209.

The cooling coils also serve to transfer the sensible energy that is vented directly into the deep well outer zone 204 from over-pressure blowdown of the reactor system or over-pressure blowdown of the steam generators. Thermal circulation of the well water through the cooling coils 209 transfers the heat to the cooling pond water.

The deep well is constructed with reinforced concrete walls; this wall provides additional biological shielding during operation of the reactor. The well is lined with steel plate 211, a high-vacuum can be maintained at the well during normal reactor operation.

Secondary containment enclosures 212 are positioned immediately above the reactor coolant pump cells 105. Manholes 213 double-flanged and bolted provide access from the enclosure down into the pump motor compartments 125 for inspection, tests, and maintenance operations. Process piping, electrical instrumentation, and control circuits are routed from the motor compartment through special penetrations into the enclosure above the pump motors 212.

An air or inert gas atmosphere is supplied to the motor compartments through piping from the enclosure above. For personnel access, air is provided to the compartment. For reactor operation the air is replaced with an inert gas. In addition to improving the transfer of heat from the motors to the fluid wihtin the containment annulus; the inert gas prevents the potential burning of electric, instrumentation and control leads. Also, the inert gas provides protection against the combustion (burning) of the lubricating oil at the pump motors during normal operation or in a LOCA. For accident protection the pump motor compartments have a missile barrier 214 formed from armor plate to contain any potential missiles from a failure of the pump fly wheels.

A secondary containment enclosure 215 is positioned immediately above the pressurizer cell 107. A manhole 216 double-flanged and bolted provides access from the enclosure into the pressurizer cell for inspections, tests and maintenance operations. Process piping, electrical, instrumentation and control circuits are routed from the pressurizer cell through special penetrations into the secondary enclosure 215.

The safety valve and relief valve headers 217 at the pressurizer are positioned so as to make the valves readily accessible for servicing from a platform positioned immediately below the manhole. The discharge headers for the safety valves are directed into the deepwell 201 through special containment penetrations 228.

The piping cell for the pipe header interconnecting the reactor coolant system and the pressurizer 108 provides communication to maintain the pressurizer cell free volume at a high vacuum. During reactor shutdown with the primary container filled with air at atmospheric pressure, the pipe cell provides access for personnel to the adjacent equipment; i.e. steam generators, pump casings, reactor vessel refill tanks, deluge tanks and the reactor vessel.

A secondary containment enclosure 218 is positioned immediately above the regenerative heat exchanger cell 109. A manhole 219 double-flanged and bolted provides access from the enclosure into the regenerative heat exchanger cell for inspections, tests and maintenance operations.

Piping connections between the regenerative heat exchanger and the non-regenerative heat exchanger are routed through the secondary enclosure. Electrical, instrumentation, and control circuits are also routed from the cell 109 through special penetrations into the secondary enclosure 218.

A piping cell interconnecting the reactor coolant system and the regenerative heat exchanger 110 provides communication to maintain the free volume in the cell at the same pressure as the balance of the primary containment free volume. This pipe cell at the opposite side of the reactor vessel cell 101 from the pressurizer cell 107 provides access during reactor shutdown to the adjacent equipment; this includes the balance of the steam generators, pump casings, reactor vessel refill tanks, deluge tanks, and the reactor vessel.

Entry into the secondary enclosures above the reactor coolant pumps is obtained through hatches 220. Unauthorized entry into the primary containment is prevented by the high vacuum present between the double flanged and bolted manholes at the entrance to the cells.

During an extended reactor shutdown, personnel entry is made into the primary containment vessel for maintenance and inspection operations. Before entry, the containment free volume is purged through high efficiency filters and activated carbon beds. Spool pieces are installed between the primary containment vacuum headers and the primary containment ventilation system to provide a ventilated atmosphere.

The reduced volume and the high vacuum in the primary containment significantly reduces (by a factor of over 400) the mass of air with particulate gamma radioactivity purged from the containment to the outside environment during reactor shutdown for refueling and maintenance operations as compared to the prior containment art. The use of a high vacuum with an initial steam purge practically eliminates the air remaining that is subject to activation by neutrons which leak from the reactor vessel to generate Argon-41, Oxygen-19, Nitrogen-16, and tritium within the containment atmosphere.

Secondary enclosure 221 serves as a pipe tunnel and valve station for piping routed from the steam generator cells. This includes the steam headers 222 and the feedwater lines 223. This piping exits out of pipe tunnel 221 through an extension of the circular-shaped piping enclosure. Penetration panels 224 are provided for piping exiting the reactor building. Vent pipes 225 are routed from secondary enclosure 221 into the deep well. The vents provide overpressure protection to the pipe tunnel in the event of a rupture of a steam header. The vents have sufficient length to serve as barometric legs.

Vacuum lines 226 from the primary container are also routed into the pipe tunnel. Steam ejectors 227 with barometric legs and vacuum pumps are piped to the vacuum lines 226 leading from the steam generator cells. This equipment is located in the auxiliary equipment shaft that is integral to the reactor building.

Isolation valves 229 are provided on the steam headers and feedwater piping within the extension of the pipe tunnel. Isolation valves are similarly provided on the vacuum lines.

Safety valves as well as dump valves on take offs 230 from the steam headers 222 are strategically located within the pipe tunnel. The discharge headers for the valves are routed into the deep well 201.

Personnel locks 231 are utilized to provide access to the pipe tunnel. The lock is positioned at a higher elevation than the floor level at enclosure 221. In the event of a pipe rupture within enclosure 221, all liquid is retained within enclosure with steam blowdown through vents 225 into the deepwell 201.

Containment is also provided by the reactor building 301 that is designed to be operated normally at a slight vacuum. The primary containment cells along with the attendant secondary enclosures, the low pressure auxiliary systems, the radwaste systems, the refueling pools, and the reactor service systems are completely housed within the reactor building.

The reactor building is circular in shape and of reinforced concrete construction. The building has a roof 302 that is supported by the building outside walls and by the four steam generator cells 103, the four refill tank cells 113, and the four deluge tank cells 116.

A rectilinear crane 303 is also supported by the reactor building sidewall and the steam generator cells. A recess at the cells provide a mounting platform for the crane rails 304.

Two equipment shafts are external to the circular portion of the reactor building, but are constructed integral with the building having the same degree of structural quality. A service water equipment shaft 305 is positioned at plant North. An auxiliary equipment shaft 306 is located at 180° to North. Service water equipment includes the component cooling heat exchangers and pumps and the service water pumps. In addition, shaft 305 contains a passenger elevator 307 and a stairwell 308.

The auxiliary equipment shaft 306 houses a freight elevator 309 and a second stairwell 308 as well as a number of service systems and auxiliary equipment.

Access to the reactor building is gained via the personnel lock 310 located adjacent to the service water equipment shaft 305. An equipment lock 311 also provides access to the reactor building. The lock is part of the structure comprising the auxiliary equipment shaft 306.

Three elevations of equipment are provided; reinforced concrete floors provide isolation between floor elevations. Special penetrations are used to route all piping, electrical conductors, instrumentation and control circuits between floor elevations and exterior to the reactor building. Personnel access means are not provided between floor elevations within the reactor building; access to each floor elevation is obtained via elevator shafts. At each floor elevation mechanically interlocked double-doors 310 provide personnel access from the passenger elevators. Equipment locks 311 provide access from the freight elevators at each floor elevation.

Individual heating, ventilating and air conditioning units are provided at each floor elevation. The units are designed for the recycling of air with make up air held to a minimum. Each unit is designed to maintain a slight negative pressure in the equipment areas. Any radioactivity accidentally released into an equipment area is vented under controlled conditions through high efficiency filters and activated carbon beds after a sufficient decay periods.

Figure 4:
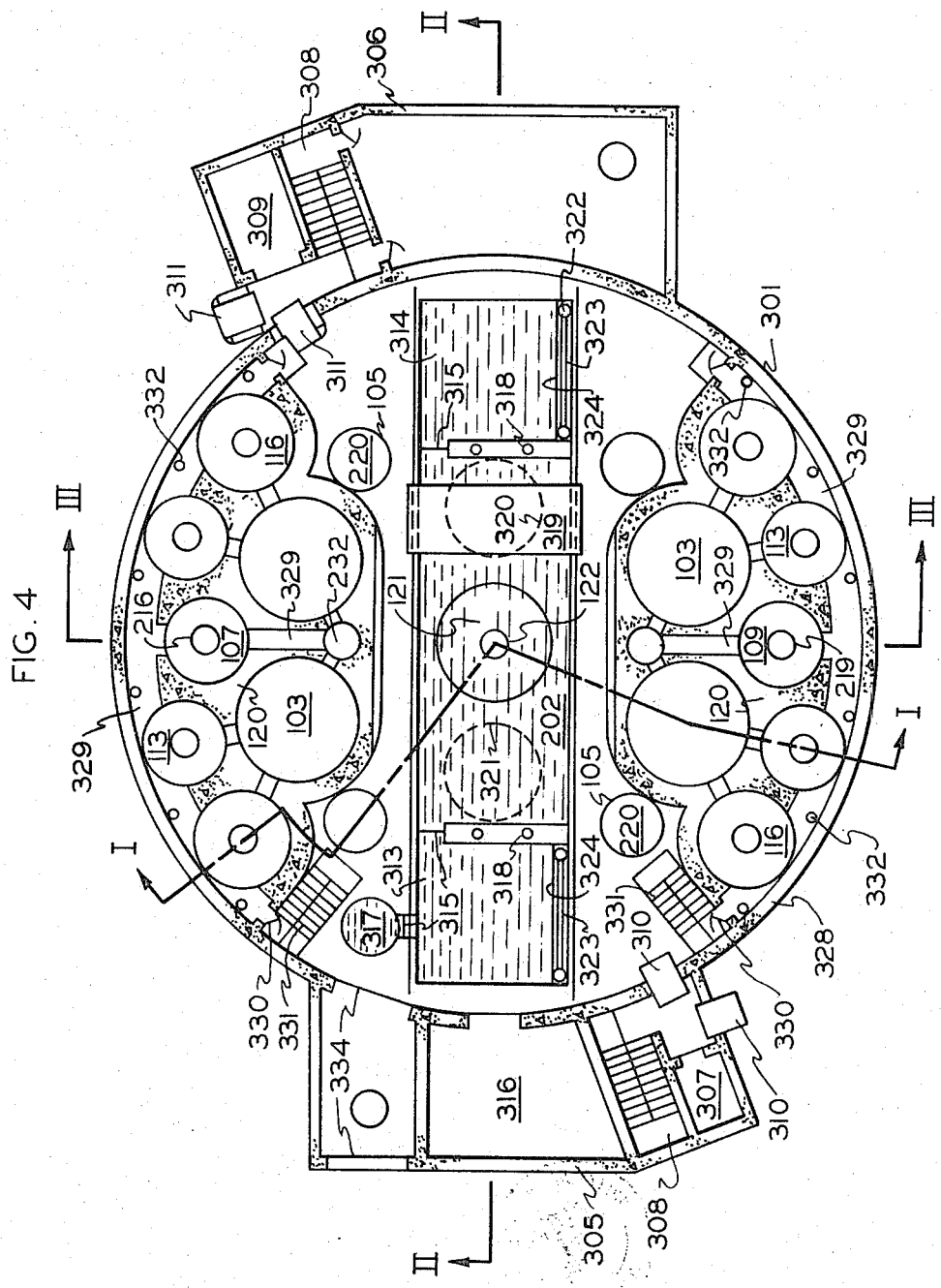
FIG. 4, 5, 6, and 7 are cross-sectional views of the reactor building arrangement of the lines IV—IV, V—V, VI—VI, and VII—VII respectively of FIG. 2.
Figure 5:
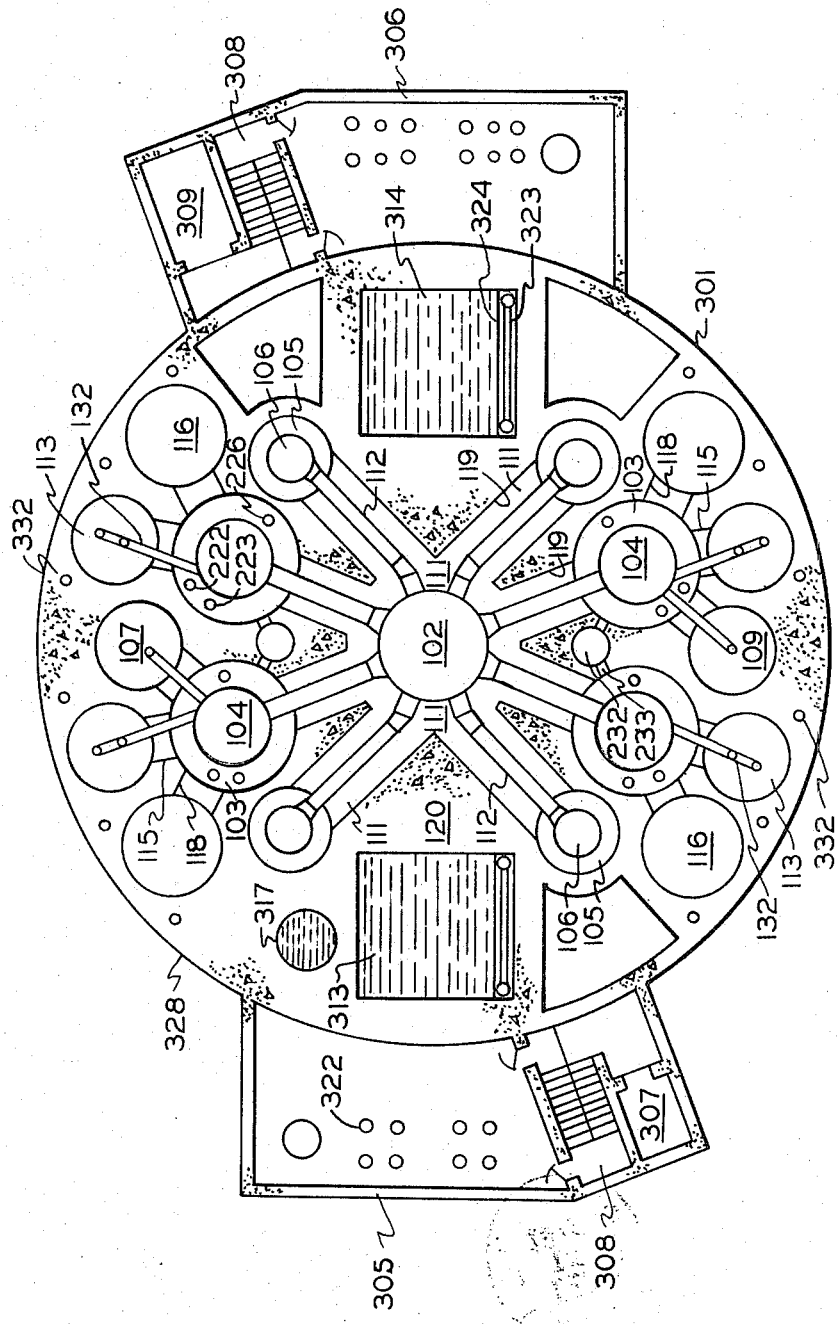
Figure 6:
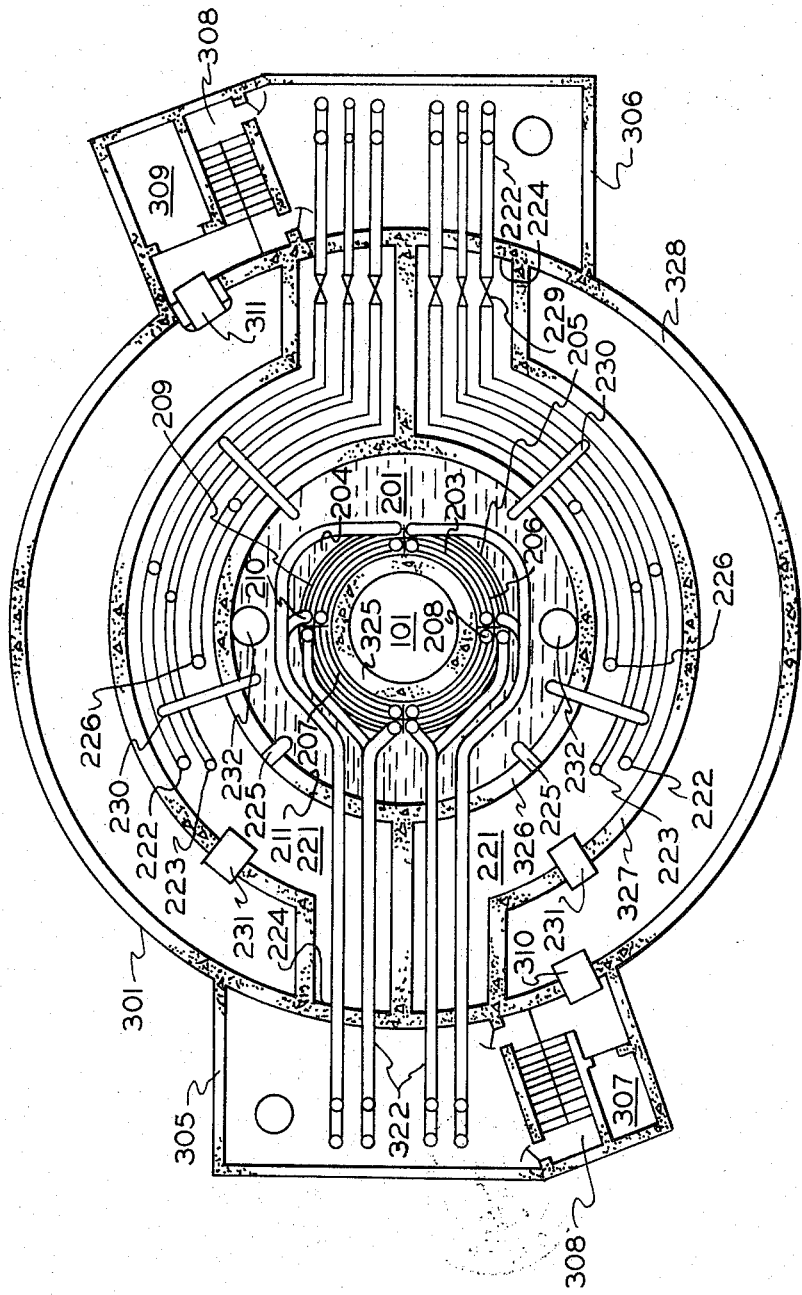
Figure 7:
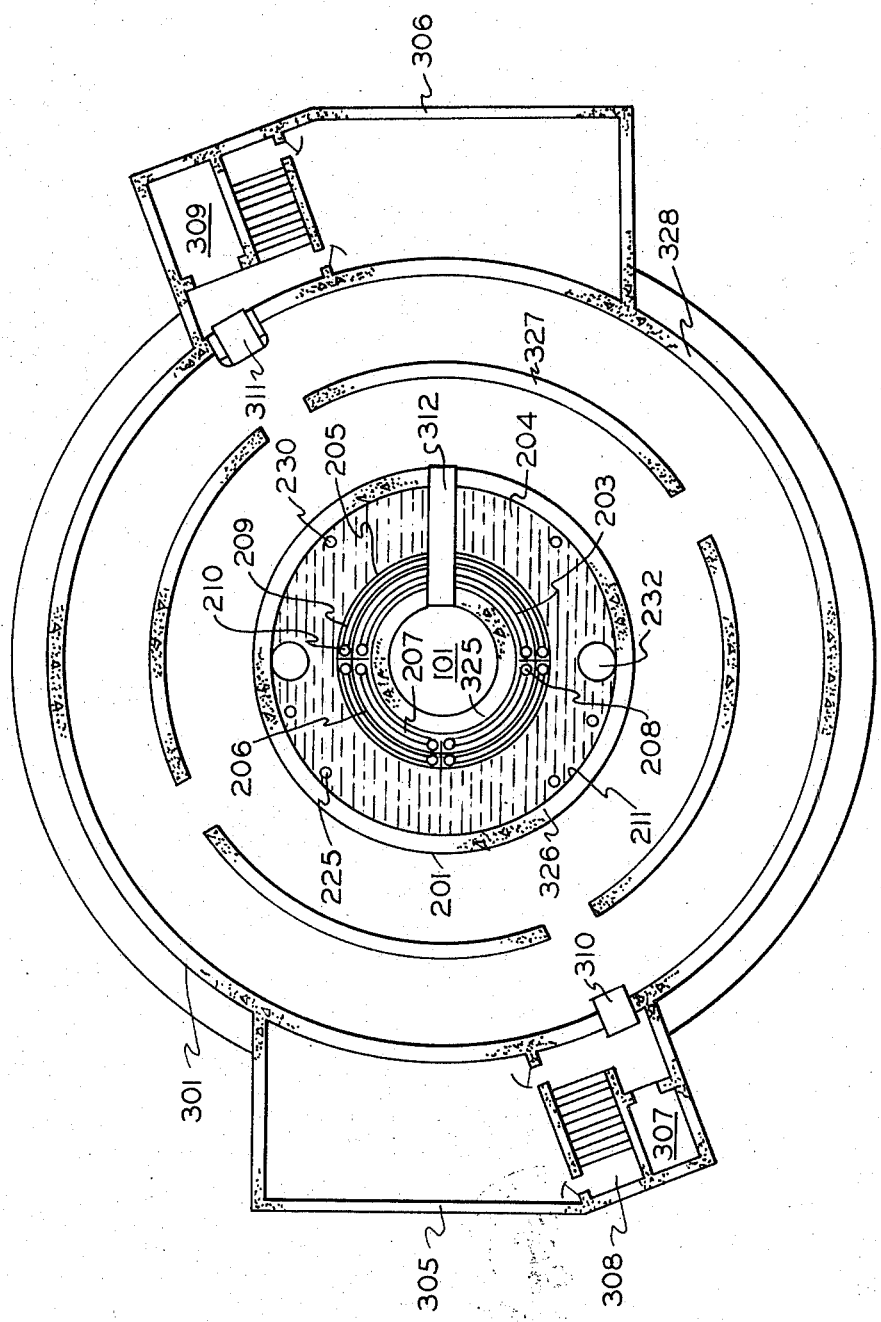

Detailed consideration is given to the practical utilization of open space surrounding the "reactor island" within the reactor building. FIGS. 4 and 5 includes area for reactor refueling operations. The open area shown in FIG. 6 is utilized for non-radioactive equipment and for service areas. Electric cables, instrumentation and control circuitry are routed from the rod drive compartment 121 to the floor elevation in FIG. 6 through steel pipes cast into concrete forming the base of the reactor refueling cavity 202 and the spent fuel pools 313 and 314. Likewise, electric cables, instrumentation and control circuitry are routed from enclosures above the pump cells 212, above the pressurizer cell 215, and above the regenerative heat exchanger cell 218 through steel pipes cast in concrete that lead to the third floor elevation. The open area shown in FIG. 7 is utilized for reactor auxiliary systems and reactor service systems including the chemical and volume control system along with ion exchange columns, shutdown cooling systems, boric acid systems and other potentially radioactive systems. Process piping connecting these systems to the reactor coolant system via the secondary enclosures are routed through pipe sleeves cast in concrete. The open areas are also utilized for radioactive liquid storage and radwaste system equipment and components. These include the systems for gaseous and liquid radwaste processing. A solid radwaste storage area is provided.

Again in FIG. 4 the reactor refueling area includes the reactor refueling cavity 202, spent fuel pool 313, and the standby pool 314. Gates 315 installed at either side of the reactor refueling cavity isolate the pools from the cavity. The reactor refueling cavity and the two fuel pools are filled with highly borated water.

On reactor shutdown for refueling, the borated water in the reactor cavity is drained into tanks located in the borated water storage area. After the flanged dome 121 is removed, the reactor vessel flanged head 124 is readied for removal. The reactor cavity is filled with the borated water from the deep well 201 as the reactor vessel head is raised with the rising water level.

The new fuel storage vault 316 is in a convenient location. On completion of the refueling operations the reactor vessel flanged head is lowered back on the vessel as the borated water is drained from the reactor cavity to refill the deep well. After the reactor vessel flanged head and the flanged dome are reinstalled, the borated water is pumped back into the reactor cavity from the borated water storage tanks. On reactor startup as the reactor coolant is heated, excess water is drained from the reactor system and stored in the borated water storage area until processed.

The spent fuel pool and the standby pool together are sized for the storage of at least 1-⅔ core loadings of reactor fuel. The spent fuel pool is utilized for normal refueling operations and the standby pool is utilized when the entire reactor core is unloaded.

The spent fuel pool is connected to an adjoining cast pit 317 through a channel equipped with a gate 315. The pit can be drained and utilized as a decontamination pit after spent fuel is loaded into the shipping cask. After decontamination, the shipping cask is moved out of the reactor building by rail via the equipment doors 334. A railroad spur (not shown) is routed into the reactor building via the equipment doors.

Overflow pipes 318 at the reactor refueling cavity and at the fuel pools are utilized in maintaining liquid level. The overflow is directed to tanks in the borated water storage area.

At the refueling elevation a bridge and trolley 319 are provided for reactor refueling and spent fuel handling operations. A bridge and trolley can be provided for each pool.

The reactor cavity 202 has sufficient space for the underwater storage of the reactor vessel core barrel 320 and for the reactor vessel internals 321 during reactor refueling operations; the flanged dome 121 and the reactor vessel flanged head 124 are stored on the laydown area provided by the missile shield transferred to the standby spent fuel pool 314 from over the reactor refueling cavity 202 for refueling operations.

Thermal convection cooling is provided at each pool for fission decay heat from the spent fuel in the pool. Paired pipe headers 322 leading to and from the cooling pond are routed into a vertical attitude within each pool. Horizontally mounted cooling pipes with extended fins 323 connect the pool inlet and outlet headers. The cooling pipes have a slight rise from the inlet to the outlet header to enhance thermal circulation. Also, the return headers to the pond are positioned at a higher elevation than the headers flowing water from the pond to the pool cooling pipes. At each pool a steel baffle 324 is positioned adjacent to the cooling pipes. The baffle fronts the cooling pipes and extends almost the full height of the pool — from near the pool floor to slightly beneath the borated water level. The pool water within the passage formed by the baffle and the pool wall is cooled and the increased density of the water causes thermal circulation to take place.

The level of the water at the cooling pond is at a higher elevation than the level of the borated water in the pools. Water leakage is monitored by periodic analysis of the boron concentration in the pool water.

Isolation valves (normally locked open) on the headers 322 permit inspection of the cooling assembly. By closing the valves and unbolting flanges at the headers (located above the pool water level) the cooling assembly can be lifted clear for inspection and cleaning. The high heat capacity provided by the pool water, allows time for this maintenance work without over-heating the pool. Transparent covers can be provided at the spent fuel pools 313 and 314 to prevent the evaporation of tritiated water when refueling operations are not in progress. Also, a missile shield is provided over the reactor refueling cavity 202 for power operation of the reactor coolant system.

FIGS. 6 and 7 show the supporting structure for the reactor complex. The reactor vessel foundation 325 that supports reactor vessel 102 and the reinforced concrete structure at the reactor refueling cavity 202. The cylindrical reinforced concrete wall 326 enclosing the deep well, the equipment foundation 327, and the cylindrical reinforced concrete reactor building wall 328 provide support structure for all containment cells, internal structures and for all equipment and components located therein.

Within the containment concrete cell structure 120 alternate passageways are provided for access into the primary containment cells besides manhole 216 at the pressurizer cell 107 and manhole 219 at the regenerative heat exchanger cell 109. The access shafts 232 to the deepwell include manholes 233 that provide direct access at the four steam generator cells 103. The shafts 232 include stairwells (not shown) that provide more ready entrance via manholes 233.

The access shafts 232 serve added functions besides providing passageways into the primary containment and into the deepwell. During reactor operation the steel lined shafts (that extend into the deepwell fluid and within a few feet from the floor) serve as discharge headers for the multiplicicy of safety and relief valves that are integral to the reactor coolant system, the steam generator secondaries, also the primary and secondary containment vessels. The safety valve headers 217 for the pressurizer discharge via penetration 228 into the access shaft 232. Relief valves 141 on the reactor vessel refill tanks 114 (sized for steam blowdown from the steam generator secondaries) discharge into the deepwell via access shaft 232. The relief valves on headers 131 leading from the tops of the deluge tanks 117 provide overpressure protection for the primary containment with discharge into the access shafts. Also, overpressure relief for the fluid in the annulus between the primary and secondary containment vessel is routed via the access shafts into the deepwell.

Access tunnels 329 at the tops of the vertically-aligned containment cells provide entrance to the safety and relief valves positioned above the components for which protection is provided. Sealed doorways 330 and stairways 331 are provided for ready access to tunnels 329. Sealed penetrations 332 are routed from the access tunnels down into the equipment areas. Overpressure protection is provided for the tunnels 329 through vents that are routed into the deepwell.

The reactor building including all internal concrete structure can be constructed prior to the delivery of reactor coolant system components to the construction site. The reinforced concrete cylindrical structures internal to, and forming the reactor building can be slipformed. Besides providing openings into the reactor building at all of the floor elevations for personnel as well as for equipment, openings are also provided at the reactor building roof. The roof openings, fitted with closures 333, are provided for the reactor vessel, the four steam generators, and four refill tanks, the four deluge tanks, and two access shafts to the deepwell. The reactor building and roof are designed to accept a crane that is utilized to install the reactor coolant system components, and if necessary, to remove and replace faulted components.

Shop-fabricated, modular steel shells are employed to construct the containment cells. The interconnections between cells are field-welded to provide one continuous primary containment vessel within a secondary containment vessel. The dished heads at the tops of the vertical steel shells at the containment cells with roof closures are field-welded after the reactor coolant system components are installed. Faulted components can also be retrieved through the roof closures by cutting off the dished head. After the component is replaced the dished head is rewelded into place and tested.

A steel encased, reinforced concrete closure is installed at each roof opening. The mating flanges at the closures have "O" rings and a pressurization and leak detection system. The closures are bolted to the mating flanges with studs.

The design features in the Passive Containment Systems offers a structure that ensures survival of the critical elements under earthquake excitations and other acts of God. Sufficient strength is provided to resist the induced inertial forces utilizing reinforced and prestressed concrete in the concentric cylindrical foundations that tie the base and roof slabs, and the floors at the various elevations into a monolithic unit. Also the massive concrete structure forming the primary containment cells, the secondary enclosures, and the refueling pool walls add stability to the structure. Added strength can be provided if required by locating radial walls between the cylinders.

In the Passive Containment System the need for connecting elements (umbilicals) to sources of emergency water is virtually eliminated. These umbilicals used extensively for active safety systems in the prior art are especially vulnerable to faulting displacements in a severe seismic disturbance. The only connecting elements utilized by the Passive Containment System are the headers to the outdoor body of water. However, these headers are not required to be functional for a period of hours after a loss-of-coolant accident. Even if a pipe break occured in one of the headers, thermal circulation would still continue, the pipe tunnel would merely fill up with water from the outdoor body of water.

The Passive Containment System is not vulnerable to sabotage. The passive safety systems are designed integral with the basic structure and are not accessible during normal operation because of the high-vacuum within the primary container.

The Passive Containment System offers a design that permits the reactor building to be undergrounded, embedded, barged mounted, or submerged as an iceberg. Each method provides a plant silohouette that is esthetically more attractive than a containment system that is positioned almost entirely above ground elevation.

Figure 8:
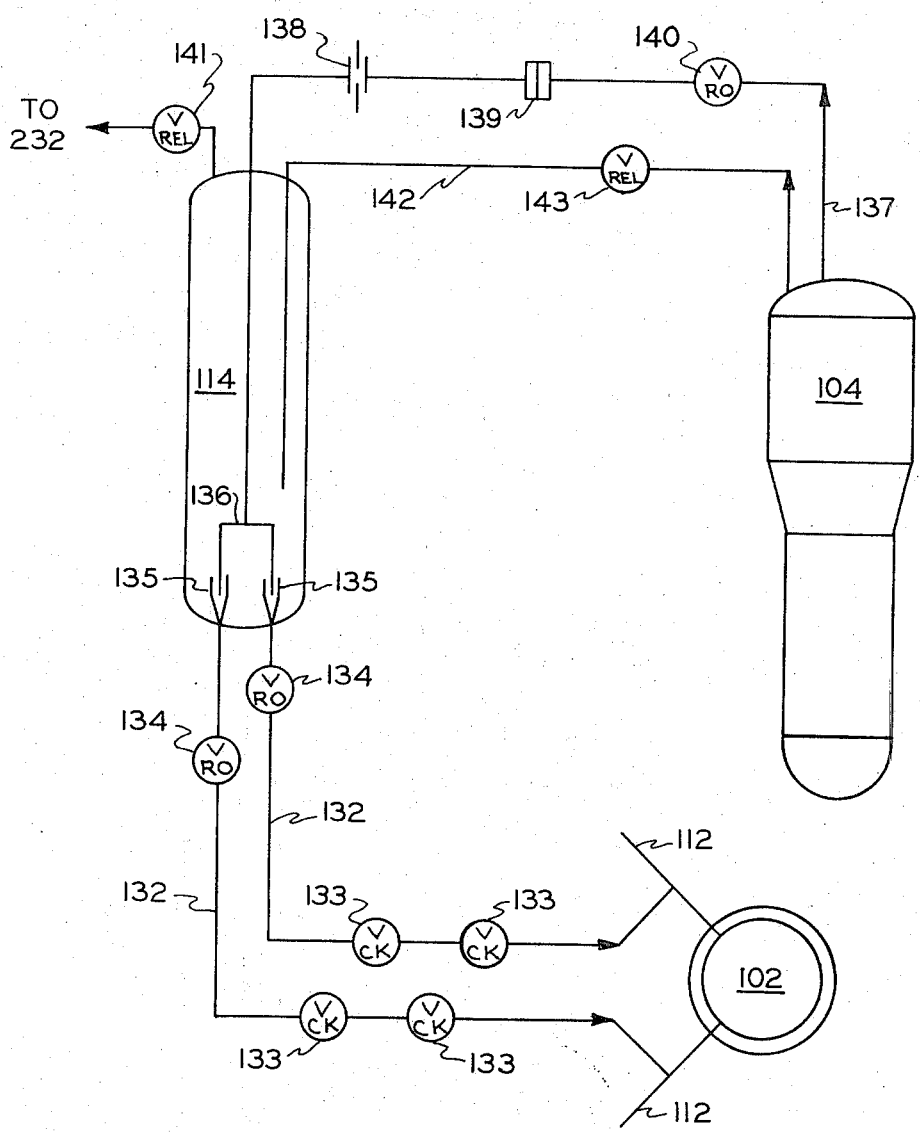
FIGS. 8 and 9 are schematic arrangements for the reactor vessel refill tanks.

FIG. 8 shows a typical piping arrangement for a reactor vessel refill tank provided for each loop in the four loop pressurized water reactor. Each reactor vessel refill tank 114 is connected to the reactor vessel via the reactor coolant system piping 112 by means of one or more safety injection headers 132. Two check valves 133 and a remotely operated valve 134 in series are provided on each safety injection header 132 provided. One or more rupture disks with disk supports (not shown) may be used on the safety injection header in place of the check valves. One or more jet injectors 135 are submerged within the refill tank 114. The diffuser section of each jet injector 135 is positioned at the bottom end of the refill tank and immerges into a safety injection header 132. The suction chamber of each jet injector 135 is open to the treated water within the refill tank to provide flooded suction. The nozzle portion of each jet injector 135 is connected to a subheader 136 branching from the steam supply header 137 that interconnects the secondary side of the steam generators 104 to provide the operating pressure fluid to the jet injectors. A flow limiting orifice 138, a rupture disk 139, and a remotely operated valve 140 in series are provided on the steam supply header 137. A safety relief valve may be used on the steam supply header 137 in place of the rupture disk 139.

Over-pressure protection is provided for the refill tank with relief valves 141 that discharge into the deep well 201 via the access shafts 232. A low capacity positive displacement pump (not shown) maintains a hydrostatic pressure on the treated water in the refill tanks 114. A refrigeration unit along with refrigeration coils (not shown) maintain the treated water within the refill tank at a low temperature.

A steam dump header 142 routed from the steam generator secondary to the bottom end of the reactor vessel refill tank is provided for steam blowdown from the generator. The steam dump valves 143 located on the dump header is actuated by the reactor control system. The relief valves 141 are designed to prevent the refill tank 114 from exceeding its design pressure for any steam dump that occurs as a result of a pressure transient produced by step and ramp changes in load.

Figure 9:
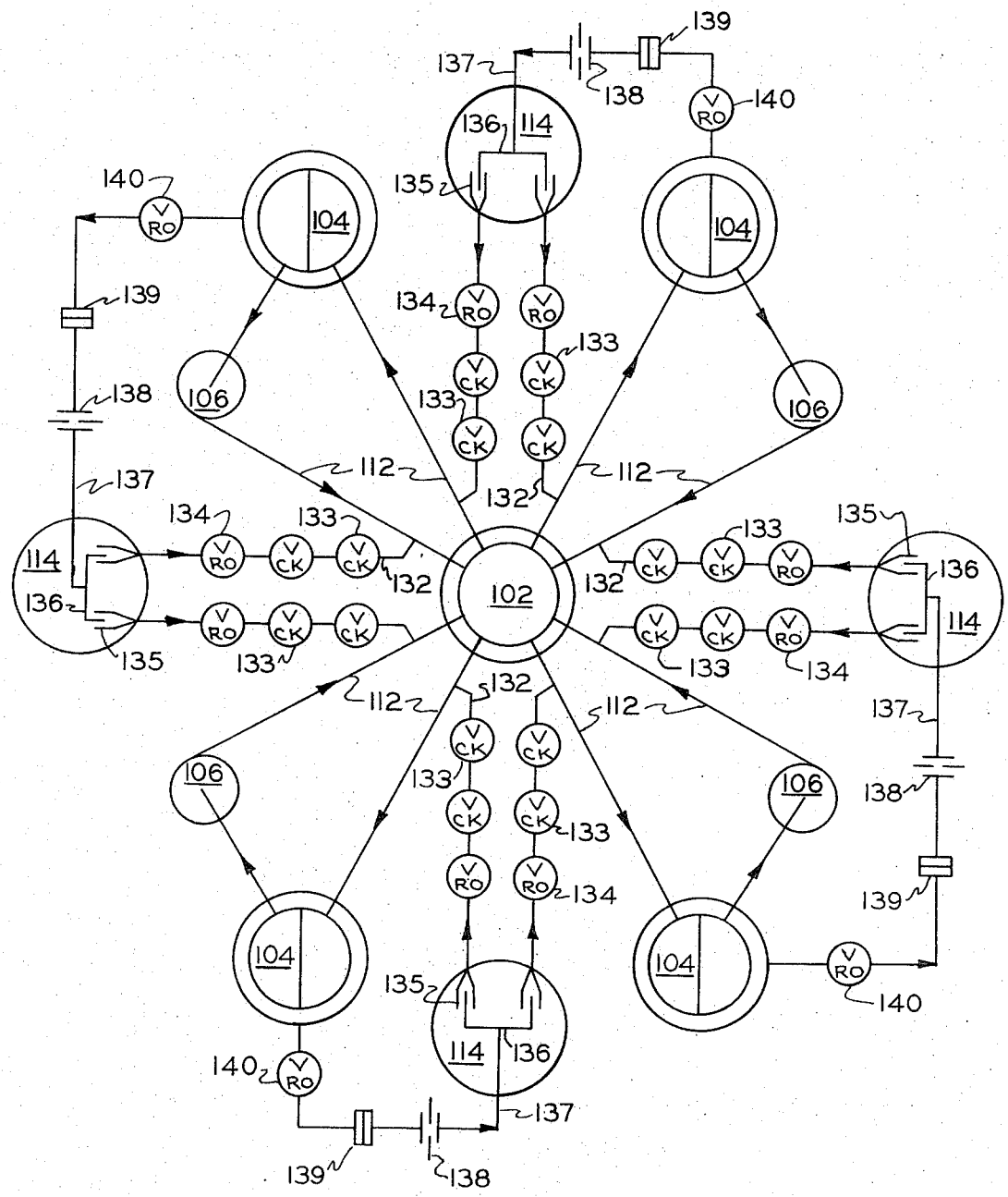

FIG. 9 shows the piping arrangement for the reactor vessel refill tanks 114 in relation to the steam generators 104 and the reactor coolant system piping 112 for a four loop pressurized water reactor. It is noted that the piping is arranged so that each steam generator is connected to a refill tank 114 through a steam supply header 137. Also, the piping is arranged so that each refill tank is connected to two reactor coolant system pipes 112 through safety injection headers 132; two refill tanks 114 are connected to the four inlets at the reactor vessel 102, and the other two refill tanks 114 are connected to the four outlets from the reactor vessel 102.

The reactor vessel refill tanks 114 along with the deluge tanks 117 provide means for the storage of all radioactive coolant released from reactor system during plant life. One of the pertinent considerations during reactor operations is the continued increase in the concentration of tritium in the reactor coolant. Tritium is an isotope with a long half-life that is produced in appreciable quantities within the coolant mainly from neutron reactions with soluble boron, lithium-6, and deuterium, also through diffusion of a portion of that formed by ternary fission within the fuel. As the concentration of tritium in the coolant increases with reactor operating time, the concentration of tritium in the humid air present over the reactor refueling cavity 202 and the spent fuel pool 313 during reactor refueling operations increases with each refueling. The allowable exposure time of plant personnel to the humid tritiated air decreases so that dilution of the reactor coolant to reduce the tritium concentration before refueling operations becomes essential. The reactor vessel refill tanks 114, the deluge tanks 117 and the deepwell 201 provide sufficient storage capacity within containment for sequenced holdup under a water management program for all tritiated water processed during the operating life of the plant. Thus, very effective shielded storage is provided for the tritiated water that is also chemically treated for use in the LOCA. Long-lived fission products in the liquid phase need not be released to the environment.

FIGS. 10 through 13 inclusive are graphical presentations of the response of reactor containment systems that illustrate the advantages of the embodiment described in detail. For these graphical presentations the reactor coolant system considered has a volume of 11,900 cubic feet containing 528,000 lb. of coolant with 306,000,000 British thermal units (Btu) of stored energy. An additional 103,000,000 Btu of energy is available for release to the containment within the first five minutes after the design basis accident. A detailed discussion of the graphs is included in the section following on operation in accident.

Operation in Accident

The response of the passive containment system to a LOCA is described for a primary containment designed for 100 psia back pressure. A four-loop Pressurized Water Reactor in normal operation generating 1,000 megawatts of electricity is selected for illustrative purposes. The design values specified are in the design range typical for the nuclear plant selected. Similar evaluations of the Passive Containment System can be made for all Pressurized Water Reactors including the two- and three-loop designs, as well as for all Boiling Water Reactors.

in the reactor system selected, the coolant absorbs heat in passage through the reactor vessel 102, releases the heat to generate steam in passage through the steam generators 104, and is recirculated through these components by the reactor coolant pump 106. The pressurizer 108 maintains the reactor coolant at about 2,100 psia pressure to suppress boiling within the reactor coolant system. For chemical and volume control of the coolant within the reactor system, the regenerative heat exchanger 110 is employed as an economizer to heat the incoming coolant with the outgoing coolant. This reactor system interconnected by piping 112, contains approximately 528,000 pounds of coolant with about 306,000,000 British thermal units (Btu) of stored energy in the coolant at a weighted average temperature of 575°F.

The primary container is designed with a free volume on the order of 100,000 cubic feet. The air in this space is initially hogged out by steam ejectors and is maintained at less than 2 psia total pressure by the vacuum pumps discharging into the deep well 201.

Deluge tanks 117 within the primary container altogether hold about 3,000,000 pounds of fluid maintained at 50°F by refrigeration. A total freeboard, slightly in excess of 5,000 cubic feet at the deluge tanks, is maintained at less than 2 psia total pressure.

The reactor vessel refill tanks are each sized to contain approximately 300,000 lb. of treated water maintained at 50°F and 350 psia hydrostatic pressure. Each steam generator secondary contains approximately 100,000 lb. of fluid with an energy content approaching 50 -million Btu. The steam generators operated in the 900 psia range at rated load. The rupture disks in the steam supply headers are designed to burst whenever the pressure in the steam generator secondaries is 650 psi higher than the pressure within the reactor vessel refill tanks. Also, the safety relief valves whenever used in place of the rupture disks are designed to "pop" at the 650 psi pressure difference. The gate valves at the safety injection headers and at the steam supply headers remain open during reactor operation at power.

For the design conditions specified at the rupture disks (or at the safety relief valves if used) withstand the pressure transients that result from step and ramp changes in load without bursting or popping. The 350 psia hydrostatic pressure at the refill tanks prevents reaching the 650 psi pressure difference setting at the rupture disks (or safety-relief valves) except in the LOCA.

In the design basis, loss of coolant accident the largest pipe 112 at the reactor coolant system ruptures. A free blow-down of coolant from the two open ends of the ruptured pipe ensues. The bulk of the coolant blowdown occurs in less than 10 seconds.

Coolant blowdown through the pipe rupture pressurizes the primary container free volume. At about 50 psia pressure, the rupture disks 129 burst and steam carry-over into the deluge tanks 117 takes place. The ruptured disk openings 129 are designed to serve as ejector nozzles, and are spaced in relation to the diffuser pipes 130 in such a manner that suction chambers at the pipe ends are formed with the pipes 130 themselves performing as diffusers to condense the steam carry-over.

The 5,000 cubic feet of free board permits about 150,000 pounds of steam to carry over into the deluge tanks 117. The low pressure noncondensables (less than 2 psia) in the primary container are entrained by the steam and are also carried over into the deluge tanks. As the deluge tanks are filled by the carry-over and by the thermal expansion of the contained fluid, coolant blowdown continues to increase the pressure at the primary container.

As the continued blowdown from the reactor system decompresses the pressure of the remaining coolant within the reactor system below the 350 psia range, the check valves or rupture disks in the safety injection headers automatically provide a flow path produced by the pressure difference. The 350 psia hydrostatic pressure within the reactor vessel refill tanks is rapidly reduced by the injection of the treated water from the tanks into the reactor system.

Blowdown from the reactor system through the pipe rupture continues to decompress the coolant remaining. As the pressure within the reactor system decreases below the 250 psia range, the pressure at the jet injectors within the reactor vessel refill tanks also decreases below the 250 psia range. This results in a 650 psia pressure difference across the rupture disks in the steam supply headers and the disks burst.

The bursting of the disks initiates the flow of steam from the steam generator secondaries to the jet injectors. Steam flow through the injector nozzles entrains treated water from the refill tanks; the steam and water are intimately mixed in passage through the diffuser sections to provide a homogeneous solution of treated water with neutron poisonous chemicals in solution. The openings at the flow limiting orifices are sized to provide sonic velocity for the control of steam flow to the injectors for the major portion of the steam blowdown. This control of steam flow through the injector nozzles provides the required efficiency for the injection of the treated water from the refill tanks into the reactor system.

Continued decompression of the coolant still remaining within the reactor system continues to increase the back pressure within the primary containment free volume. At approximately 100 psia back pressure in the primary container, the coolant blowdown from the reactor system is arrested by pressure equalization. With reactor coolant blowdown arrested, the injection flow from the jet injectors — designed for about a six inch per second fill rate — continues until the reactor vessel is refilled and an overflow through the pipe rupture occurs. The steam generator secondaries continue to provide the operating pressure fluid for the jet injectors until the secondary steam generator pressure is approximately equal to the containment back pressure. With pressures equalized the refill tanks still contain a small amount of the treated water.

The application of steam generator secondary fluid for reactor vessel refill exhausts the stored energy in the steam generator; this stored energy produces steam binding that adversely affects reactor vessel refill in the prior art.

Alternately the use of safety-relief valves in place of the rupture disks limit the mass of steam generator secondary fluid utilized for safety injection. The injection flow continues until the steam generator secondary fluid is decompressed to the reset pressure for the safety relief valves. The reset pressure is designed to provide sufficient injection flow to refill the reactor vessel for the reduced containment back-pressure design.

The arresting of reactor coolant blowdown also terminates the carryover of steam from the containment into the deluge tanks. The static head of fluid within the tanks causes a flow reversal through the ruptured disk openings with the termination of steam carryover. Gravity flow from the deluge tanks fills the containment; the deluge provides a volume of fluid almost equal to that present in the free volume of the primary container. Thus, the reactor coolant piping is completely submerged and refilled by the deluge fluid.

After deluge with temperatures within the primary container and within the reactor vessel approximately equalized, the weighted average temperature of all fluid is about 160°F. This temperature reflects the total stored energy in the coolant (306,000,000 Btu) and in the steam generator secondaries (200,000,000 Btu) plus an additional 103,000,000 Btu in the form of stored energy from the nuclear fuel, internal structures and reactor components, as well as the decay heat release for the first 5 minutes after the accident. At 160°F, the vapor pressure within the reactor coolant system is less than the combined pressure of the containment atmosphere and the static head of fluid above the pipe break; this permits fluid to flow into the reactor system refilling the system to the level of deluge fluid.

In the loss of coolant accident with the nuclear fuel always cooled and with safety injection taking place that effectively refills the reactor vessel within a few minutes after the pipe break, the melting of fuel is prevented. The fission products escaping from the fuel are limited to the "prompt" release that results from mechanical clad failures. This restricts the release to fission products that have migrated to the void space between the fuel and cladding. The prompt release is confined to a few percent of the fuel inventories of noble gases and iodines. This release is small compared to the releases which must be assumed in current licensing practices.

The primary container is at elevated pressure only a short time, less than 5 minutes, in the LOCA. Any leakage from the primary container is for the most part retained by fluid in the secondary container. Any leakage through container penetrations is confined within the secondary enclosures. Also sufficient deluge fluid is present in the primary container to take into solution most all fission products escaping from the fuel in a prompt release.

After deluge with its temperature at 160°F, the fluid now flooding the primary container has sufficient heat capacity to absorb the decay heat generated during the first hour after the accident without the primary container pressure increasing above atmospheric pressure. In this time period the decay heat generation rate has decreased appreciably. The passive heat transfer system is designed to transfer the decay heat at the generation rate present after the one hour period, about 188,000,000 Btu per hour. This heat transfer requirement is actually lower with an accounting for the heat transfer to the outdoors taking place in the first hour. The passive heat transfer systems using the coupling fluids in the deep well and in the container annulus are designed for the decay heat transfer rate specified with the deluge fluid in the primary container at 200°F maximum and the outdoor body of water at 100°F maximum. At these conditions the vapor pressure combined with the pressure of the noncondensables in the primary container is retained below atmospheric pressure and out-leakage from the containment does not occur in the post accident period.

The Passive Containment System can be placed into service on a complete outage of active cooling water systems as on complete loss of electric power or in a flood inundating the active systems. The activate passive heat removal, the primary container is flooded with fluid from the deluge tanks.

The stored deluge fluid, the reactor vessel refill fluid and the fluid in the annulus between the primary and secondary containers have various chemicals in solution to serve as neutron poisons, oxygen getters, fission product getters, and freezing point depressants. The neutron poison considered may include but are not limited to boron, cadmium and hafnium. In addition to operating the primary container at a high vacuum and degassing the fluids, additives such as hydrazine and sodium sulphite can be used as oxygen getters. The fission product getters may include but are not limited to sodium hydroxide and sodium thiosulphate. The freezing point depressants are not limited to the numerous related alcohols, such as ethylene glycol.

These chemical additives serve a definite purpose in the accident situation. The neutron poisons prevent the nuclear fuel from getting "critical" at the low fluid temperatures in the post accident period.

The oxygen getters serve as oxygen scavengers for the radiolytic oxygen formed by the decomposition of water in the post accident period. By scavenging the oxygen, an explosive concentration with radiolytic hydrogen cannot be formed. A sufficient amount of scavenging agent can be added to the fluids to combine with all of the oxygen generated in the post accident period to virtually eliminate and radiolytic oxygen release to the containment atmosphere. In addition, the fuel is maintained well below the spontaneous ignition temperature for a hydrogen-oxygen mixture, also, hydrogen combustion is prevented by flooding the potential ignition sources.

The deluge fluid and the reactor vessel refill fluid are able to take almost all of the fission products into solution. In addition dissolved chemicals can be used to combine with the fission products to form stable compounds. This provides additional assurance that fission products cannot leak out of the containment in the post accident period.

The freezing point depressants allow the fluids used for accident containment to be maintained at low temperatures without the danger of freezing into one solid ice cake. By lowering the freezing point, the thermal capacity of the dense fluid is increased to provide an even lower post accident containment pressure.

Specific attributes of the Passive Containment System are exemplified to show its uniqueness and superiority in nuclear reactor containment design. These attributes are highlighted with the aid of graphs presented in FIGS. 10 through 13, inclusive.

Figure 10:
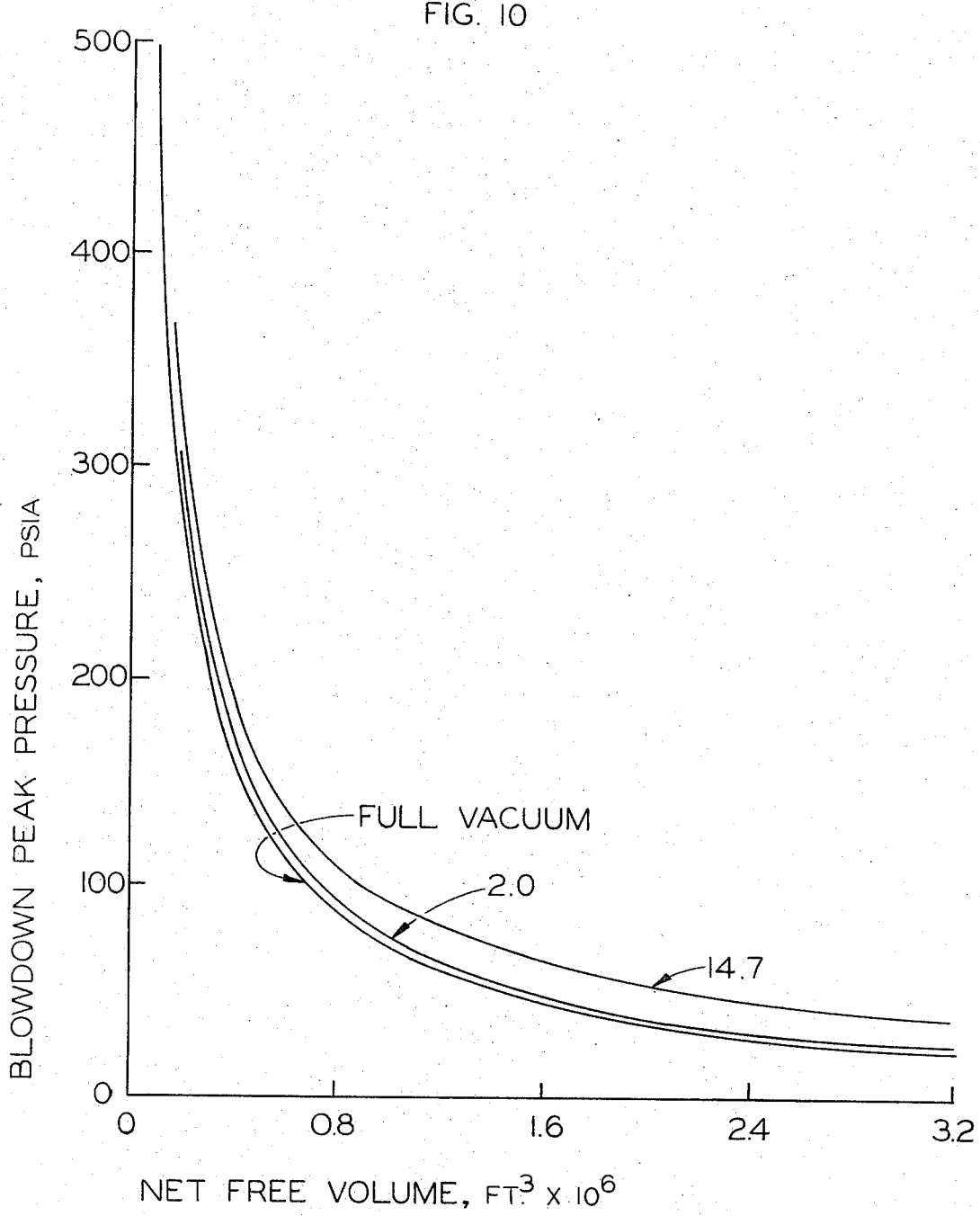
FIGS. 10 through 13 inclusive graphically depict various containment considerations in the design basis, loss-of-coolant accident for a pressurized water reactor that generates 1000 mw of electricity, and specifically.
Figure 11:
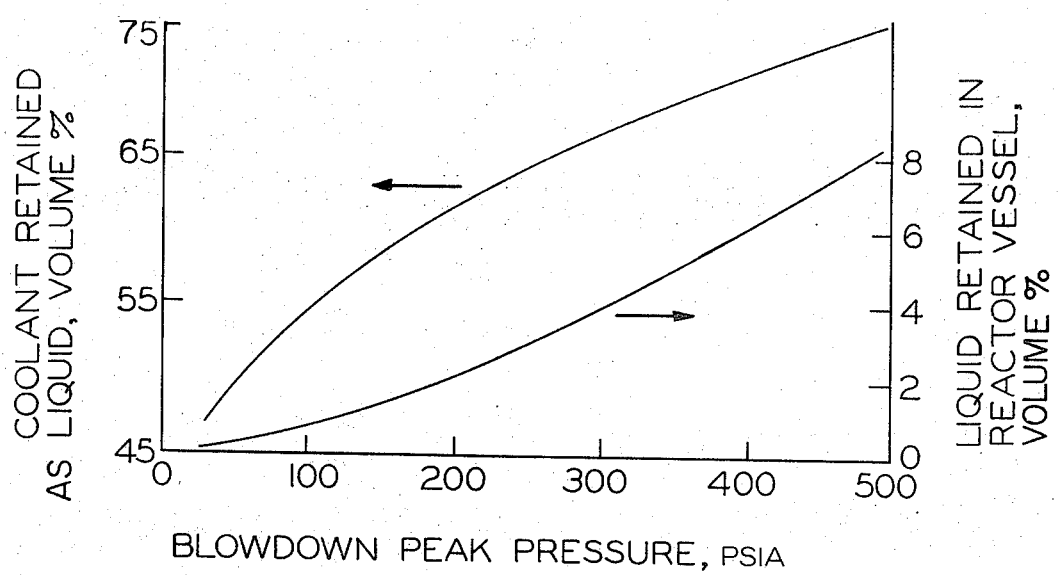

As the peak accident design pressure is increased, a significant reduction in the primary container free volume requirement is attained, FIG. 10. Again, as the containment peak accident pressure (primary container back pressure) is increased, the mass of reactor coolant, retained in the liquid phase is increased markedly, FIG. 11.

An object of this disclosure is to specify a containment system that attains by passive means sufficient cooling to prevent the nuclear fuel from overheating and melting in the LOCA. Full pressure (dry-type) containment requires excessively high back pressure to accomplish this object.

Steam carry-over into the deluge tanks is utilized to reduce this full pressure containment requirement. Steam carryover provides a higher energy carry-over per pound of coolant as compared to energy carry-over for the vapor suppression pool system in the prior art (about twice as much energy per pound of coolant on the average). With steam carry-over, sufficient coolant is passively retained within the reactor vessel of the Passive Containment System to prevent overheating of the fuel.

The containment systems in the prior art are dependent on active coolant injection systems to supply makeup coolant into the reactor vessel. If the active systems fail to operate, gross melting of the fuel takes place within a score of minutes after pipe rupture in the design basis loss of coolant accident.

Figure 12:
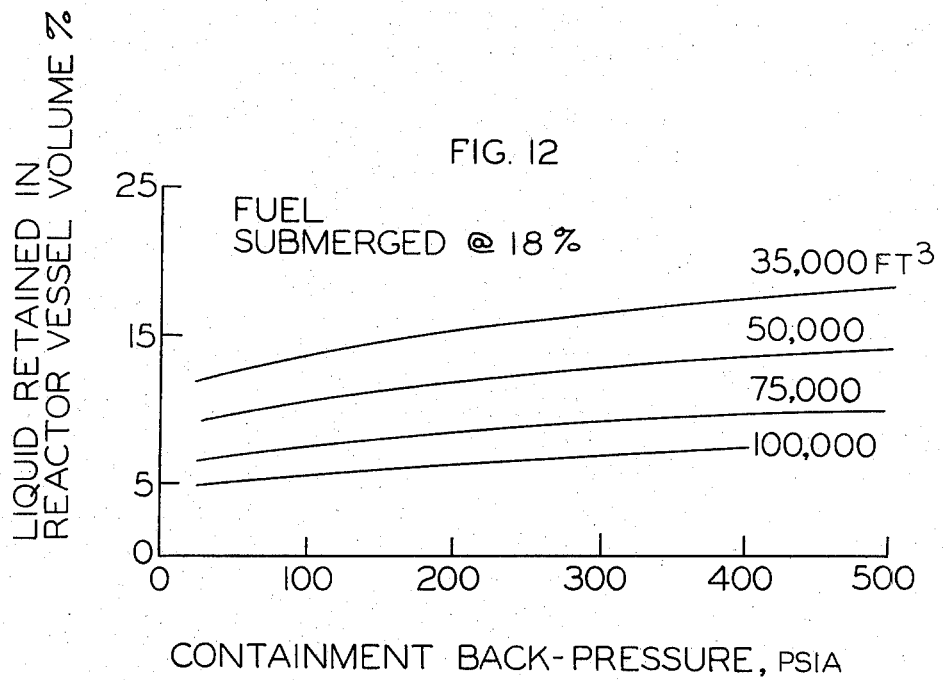
Figure 13:
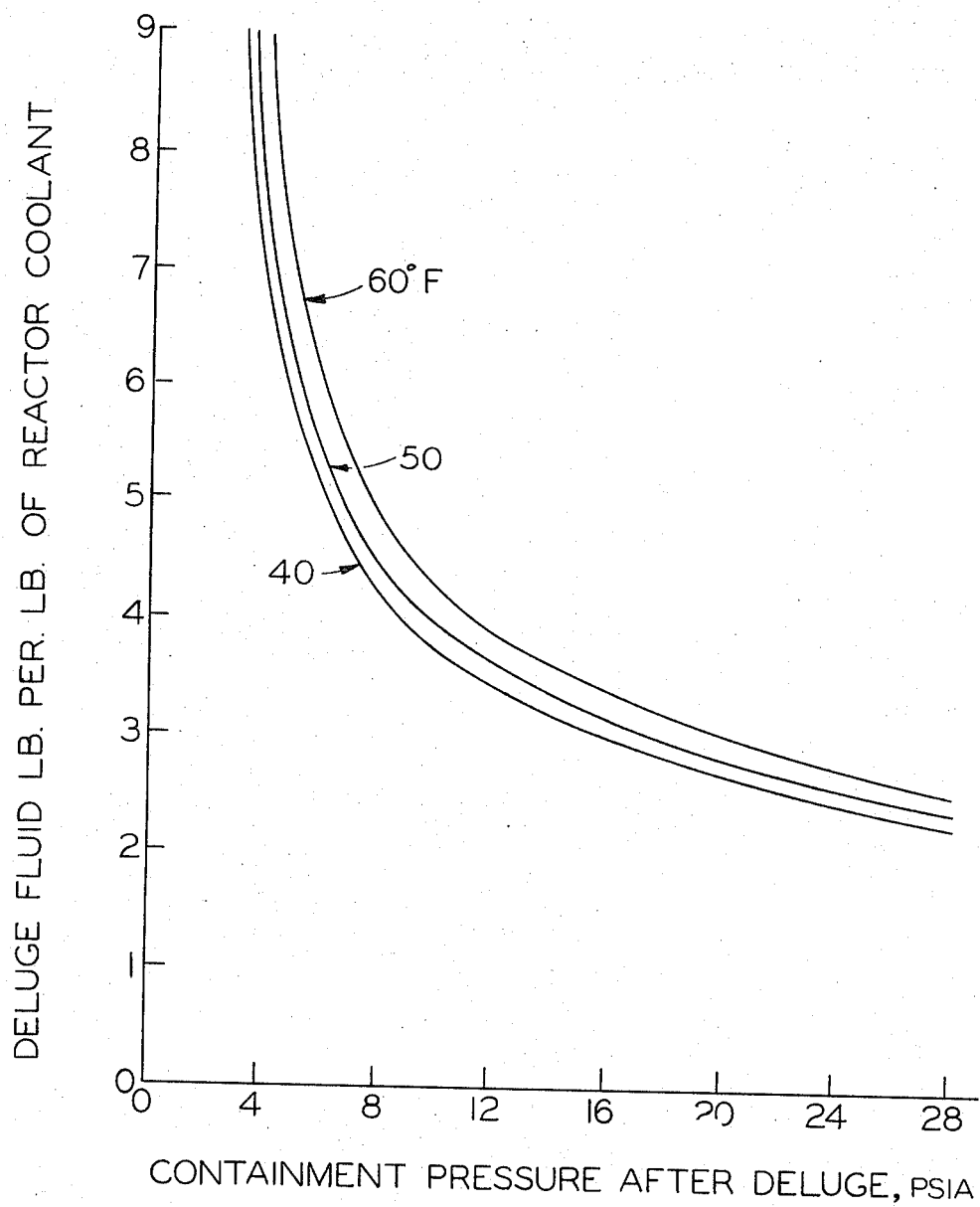

With steam carry-over into the deluge tanks, the pressurevolume requirement is significantly reduced compare FIG. 12 to FIG. 10. In order to retain coolant at the fuel, a moderate back pressure is utilized to prevent excessive blowdown from the reactor vessel. Also, the primary container free volume is restricted so that the mass of coolant present within the primary container itself at the peak accident pressure is not excessive.

In the analysis of the coolant blowdown for the graphical presentations (FIGS. 11 and 12), it is conservatively assumed that the same ratio of liquid to steam exists in the primary container as in the reactor vessel. In actuality, the bulk of the coolant blowdown taking place is two phased (liquid and steam) so that more liquid is retained within the reactor system than the analysis indicate. The pressure-volume values required to retain coolant within the reactor system is thus conservatively indicated in FIG. 12.

In the Passive Containment System all extrinsic materials are removed from within the primary containment to reduce its size in order to design for the necessary pressure-volume relationship that retains coolant at the fuel during coolant blowdown. These materials include the evacuation of air in addition to the removal of all auxiliary systems, auxiliary components and internal structures. The evacuation of air to a high vacuum eliminates the need for thermal insulation at the reactor coolant system external surfaces. Such auxiliary systems as the pressurizer quench, containment spray, service water, hot and cold drains, and also the containment coolers consisting of fan units, filter units, moisture eliminators, cooling coils, ductwork, instrumentation and controls are either eliminated or displaced from within the primary container. Auxiliary components such as the reactor building crane, refueling bridge and trolley fuel transfer mechanisms and fixtures, and reactor vessel servicing equipment are displaced from the primary containment and are made accessible for servicing at all times within the reactor building. Also displaced from the primary container are the massive concrete structures forming: internal walls and floors, equipment supports; namely, supports for the reactor coolant system components, biological shields, missile shields, reactor refueling cavity walls and fuel transfer canal walls, and the need for large diameter openings for equipment replacement. The materials itemized are all normally present in the existing containment systems for the Pressurized Water Reactor. The removal of these materials from the primary containment further exemplifies the unique character of the Passive Containment System.

By removing the extrinsic materials from within the primary container, the internal volume is sufficiently reduced so that small diameter interconnected primary containment cells can be utilized in the Passive Containment System. The cell diameters are reduced by factors of about 5 to 10 as compared to the diameters of existing containment structures for the Pressurized Water Reactors. By reducing the containment cylinder diameters by a factor of five or more, the containment peak accident pressure can be increased by approximately the factor of 5 or more with the same containment wall thickness dimensions for a given material.

The gain in reactor containment design realized by these attributes of the Passive Containment System are readily shown by containment net free volume requirement for the various containment systems for nuclear power plants operating in the same power range:

| | |
|---|---|
| Full Pressure (Dry type) | 2,610,000 cu ft |
| Vapor Suppression, utilizing ice | 1,200,000 cu ft |
| Vapor Suppression, utilizing water | 278,000 cu ft |
| Passive Containment System 100 Psia back-pressure | 100,000 cu ft |

This significant reduction in the size of the containment enhances the design bases for the Passive Containment System. The small volume of air enclosed within the primary container is readily hogged out within a 2-hour period of time by the steam ejectors. Low pressure steam can be used to help flush out the air. A high vacuum (less than 2 psia) is readily maintained with a 2 cfm vacuum pump; the leakage that can be handled by the pump is higher than the acceptable range of leakage 0.1 to 0.5 percent per day currently in use. The vacuum pump discharge is directed into the deep well. Also, during maintenance operations, the primary container is readily ventilated using spool pieces to connect the reactor building ventilation system to the vacuum lines emerging out of the primary container.

The small enclosed free volume in the primary container enhances the retention of liquid coolant within the reactor system. Basically, as the enclosed free volume is decreased in size, the amount of coolant hold up within the primary container decreases in proportion; and thereby increases the coolant retained in the reactor system. Again, as the container back pressure is increased, the amount of coolant present in the liquid phase is increased; this is the case for both the reactor system and the primary container held at fixed volumes. With steam carry-over into the deluge tanks taking place during coolant blowdown, greater flexibility is provided for establishing the container size and back pressure. The steam carry-over into the deluge tanks also decreases the enthalpy of the coolant remaining. A lower enthalpy results in a higher proportion of the coolant mass retained as liquid at a set back pressure, as compared to coolant at the higher enthalpy. The fundamentals offer greater latitude in the containment design and permit the optimization of the steam carry-over, the container free volume and the back pressure so that the nuclear fuel remains effectively cooled throughout the loss of coolant accident. These design features are applied in the development of the graph in FIG. 12.

Added considerations in the establishment of the container free volume and the design pressure are the accessibility desired for shutdown inspection and maintenance operations; the cross sectional flow areas required for coolant blowdown; and the flooding of the containment with deluge fluid so as to passively refill the reactor coolant system. In sizing the primary container, it may be desired to provide more space for inspection and maintenance operations than the design permits for retaining the fuel submerged in coolant. The inventory of blowdown coolant in the enlarged container may leave an insufficient amount within the reactor system. In the case herein, passive safety injection means are utilized within the primary container to inject makeup directly into the reactor system.

Again, it may be desired to design the primary container for a lower pressure than the design permits for retaining the fuel submerged in liquid coolant. The reactor vessel refill system herein is also employed to augment the coolant retained at the lower back pressure in order to completely submerge the fuel.

The treated fluid within the reactor vessel refill tanks is degassed with excess chemical deaerant in solution to scavenge radiolytic oxygen generated after a LOCA in conjunction with the deluge fluid. This is a decided improvement over the prior art that utilizes an inert gas for fluid injection. Fluid pressurized with an inert gas becomes saturated with the gas. An outgassing occurs during safety injection that adversely affects reactor vessel refill especially by varying the density of the liquid at the reactor vessel downcomer.

The treated fluid under hydrostatic pressure within the refill tanks offers still another feature. The hydrostatic pressure in the refill tanks and the burst pressure for the rupture disks at the interconnecting steam lines from steam generator secondaries can vary between refill tanks to enhance reactor vessel refill. Again, this feature offers a decided advantage over the prior art that utilizes an inert gas for the passive injection of fluid into the reactor vessel. Any variation in the injection pressure or in the pressure loss at the interconnecting piping to the reactor vessel varies the injection rate and the injection time. Any variation in the injection time continues to adversely affect the liquid density at the reactor vessel downcomer (downcomer static head) as each accumulator empties and the cover gas bubble from each tank passes through the reactor vessel downcomer.

The passive containment system provides the degree of protection required to prevent an adverse temperature rise at the nuclear fuel in a LOCA. Summarizing, the response of the system is to provide a sufficiently high containment back pressure to arrest blowdown with sufficient coolant retained at the fuel for effective heat transfer. Rapid passive injection of treated fluid takes place through all nozzles at the reactor vessel (except through the faulted pipe) to refill the reactor vessel for continued heat removal. Passive heat transfer circuits provide decay heat rejection for the post-accident period. Optimization of the design back pressure becomes a part of the detailed design of the nuclear power plant.

Prior art containments that are dependent on active engineered safety systems are subject to the following phenomena which result from an excessive temperature rise at the fuel for an extended time period:
1. Embrittlement of the zircalloy cladding
2. Fuel swelling causing flow blockage
3. Melting of brazed connections and low melting point alloys such as silver-indium-cadmium
4. Swelling of boron-carbide elements
5. Exothermic metal-water or steam reactions.
6. Burning of the hydrogen released by the metal-water reactions
7. Uranium oxide-zircalloy reactions
8. Fuel melting resulting in a gross release of fission products
9. Slumping of molten fuel.

The passive containment system provides protection for an accidental reactor transient which results in a pressure surge that is beyond the capability of the multiplicity of relief and safety valves on the pressurizer. A transient of this type may result from common mode failures that negate reactor scram. This protection takes the form of rupture disks mounted in manways located at the channel head inlets on the steam generators. The rupture disks are designed to burst at a specified pressure that exceeds the 10 percent margin above the maximum allowable working pressure for the safety valves as prescribed by code for nuclear power plants.

As an example a pressure surge that exceeds the maximum allowable working pressure of the reactor coolant system by 15 to 20 percent bursts the rupture disks in the inlet manways. This produces a controlled loss of coolant accident in those parts of the reactor system that results in the least disturbance. The reactor transient is checked by steam voids at the core and is completely shutdown by the neutron poisonous fluid injected into the reactor vessel from the refill tanks. The balance of the passive containment system is equally as effective throughout the accident period as in the LOCA.

A full-scale test of a LOCA can be performed to demonstrate the effectiveness of the Passive Containment System. A rupture disk, sized to simulate the desired pipe break, is mounted on a steam generator manway. The disk is designed to burst at a pressure in excess of the normal operating pressure of the reactor coolant, but less than the normal settings of the relief and safety valves. During reactor operation the bursting of a rupture disk at an inlet manway simulates a "hot leg" LOCA; the bursting of a rupture disk on an outlet manway simulates a "cold leg" LOCA.

The Passive Containment System provides protection against other accidents that are postulated as a basis of containment design in the present art:
1. Accidents that may result in an over-pressure transient at the reactor coolant system. These accidents include an uncontrolled control rod assembly withdrawal, an instantaneous seizure of a reactor coolant pump rotor (locked rotor accident), a loss of external load and others. Power operated relief valves at the pressurizer provide over-pressure blowdown to the deepwell. The heat sink provided at the deepwell is not limited in capacity for the postulated accidents.
2. Accidents that may result in an over-pressure transient at the steam generator secondaries. These accidents include a loss of external load, a steam generator tube rupture, a rupture of a steam pipe and others. Steam dump valves provide over-pressure with blowdown to the deepwell to the reactor vessel refill tanks, and to the turbine condenser. Steam blowdown to the outside environment with a potential release of radioactivity is not necessary as is the design practice in the prior art.

The passive containment system is designed to safely accomodate the range of pipe breaks that are beyond the make up capability of the charging pumps in the plant's chemical and volume control system. The passive containment system can also accomodate faults with a break size that varies with time, i.e., a hairline crack that initially weeps and then rapidly develops into a pipe rupture.

Means are provided at the primary containment for the rapid detection of coolant leakage and also the place at which the leak is occurring before the point of leakage has time to develop in size. These means include condensation and filtering of the containment exhaust at the vacuum pump inlet. The exhaust is monitored for radioactivity, and also for liquid carryover utilizing an electrode (spark plug) technique.

The leakage is as a vapor and the greater part is condensed by the cold wall provided by the cooling water within the containment annulus. The condensed liquid flows into one of low point drains; the steam generator cells, the reactor vessel cell in both lower and upper compartment and at the pump cells in both lower and upper compartments. Electrodes mounted for leak detection are positioned for each drain point.

Continuous leak detection for the containment is offered by the water annulus between the primary and secondary containment vessels, by water seals at the process piping emerging from the containment, and by the pressurization of the miscellaneous containment penetrations with an inert gas. Any leakage into the primary containment free volume is detected by the means provided for reactor coolant leakage detection.

An impending flaw at the reactor coolant system is more readily detected by the absence of thermal insulation at the external surfaces of the coolant system. During reactor shut-down a rapid surveillance of these external surfaces can be made. Also, the absence of insulation permits remote surveillance during reactor operation utilizing TV cameras, boroscopes and other remote means.

It is noted that a small enclosed free volume in the primary container enhances the fluid deluge by making possible a complete fill of the primary containment that in turn assures a refill of the reactor coolant system. The removal of the thermal insulation at the reactor coolant system provides a good heat flow path through the metal walls for the transfer of the stored energy remaining in the reactor system after blowdown, as well as for the shutdown gamma heat. The placement of the deluge tanks offers freedom in providing a sufficient quantity of fluid and in chilling the fluid so that sufficient heat capacity is present in the deluge fluid to return the primary container to a high vacuum (low vapor pressure) as shown in FIG. 12. This may be contrasted to the containment systems in the prior art that retain an elevated pressure within the containment for days after an accident.

A small enclosed volume in the primary container further enhances the inherent safety features of the Passive Containment System that prevents the combustion of radiolytic hydrogen. This hydrogen is formed from the decomposition of water by the high intensity gamma radiation present within the reactor vessel. The combustion of hydrogen is prevented by oxygen depletion; the small primary container is pumped down to a high vacuum so that only a trace amount of oxygen is present; the dissolved oxygen concentration in the deluge and refill fluid is depleted by mechanical deaeration and by chemical deaeration to remove the last traces of the dissolved oxygen; also a sufficient amount of residual chemical deaerant is added to the deluge fluid to completely scavenge the radiolytic oxygen formed (for example 400 parts per million or more of sodium sulphite). Also, the low coolant temperature after deluge arrests boiling and prevents the stripping of radiolytic oxygen and hydrogen to promote the back reaction recombining the radiolytic gases, and the low temperature keeps the radiolytic hydrogen below the flammable temperature range.

Chemical additives are incorporated into the deluge fluid to enhance fission-product dissolution and trapping to assure their retention. An alkaline-borate solution containing sodium thiosulfate is effective in retaining iodines. As added benefit of the alkalines is that they serve as pH agents to limit corrosion.

The alkaline-borate solution also serves as a neutron poison. A sufficient amount of boron is made available so that after deluge with the reactor coolant system refilled, the concentration of boron is above 2,000 ppm throughout the fluid in the primary container and reactor system. There is no danger of crystallization at the relative low concentration of boron.

The invention hereof can be usefully applied to nuclear reactors employing light and heavy water, liquid metal, and/or molten salts. Because of longer experience with light water breeder reactors (LWBR) and the compelling need for urban siting of such powerplants, the instant disclosure importantly makes possible the realization of such installations within economic constraints, and within the desired ten mile radius of cities. Such underground or underwater installations for LWBR are readily possible by employing the inventive concept herein.

Radioactivity containment is of prime concern in the instant invention. Containment during normal operation as well as during LOCA, and particularly during post accident heat removal requirements, by employing novel high vacuum conditions is now possible through the instant disclosure and its related teachings. The invention lends itself to a practical design for power reactors in that the free volume hereof required for containment purposes between the inner and outer chambers is realistically small and economically very desirable. Biological containment is inherent.

It may thus be seen that the instant invention is broad in scope and since departures from the specific system and configuration herein described may be made by persons skilled in the art without departing from the concept hereof. For instance:

1. The primary containment cells can be designed with a steel primary container backed by concrete; the secondary container and the water annulus are not utilized;
2. The development of water-cooled motors can reduce the number of compartments required with a gaseous atmosphere for heat transfer, such as, the reactor coolant pump motors;
3. All steam generator cells can be compartmented to significantly reduce the primary container free volume; a steel diaphragm, seal-welded to the steam generator tube sheet and to the cell liner separates each steam generator into two compartments;
4. The deepwell can be designed with the second set of heat exchange units placed in the outdoor cooling pond instead of being placed in the deepwell;

5. The deepwell can be designed without a heat transfer coupling fluid and without the second set of heat exchange units; in the LOCA, sensible heat from the deluge fluid is transferred directly to the cooling pond water through the first set of heat exchange units; and 6. The freeboard at the deluge tanks can be significantly reduced by designing for over pressure relief of the non-condensables gas carryover through the relief valves at the deluge tanks discharging into the deepwell.

It is intended that all matters contained in the aforegoing drawings and description shall be interpreted as illustrative and not in a limiting sense.

The invention claimed is:

1. A safeguard system for a nuclear reactor power plant having a reactor assembly with a reactor core including fuel therein, at least one steam generator, said steam generator having a first operative connection to said reactor assembly for the flow of a high-temperature high-pressure reactor coolant therethrough, said reactor coolant having a first pressure the magnitude of which is substantially constant during conditions of normal operation, and a containment structure sealingly enclosing at least said reactor and said steam generator, said safeguard system comprising at least one reservoir of cooling liquid disposed generally internally of said containment structure, said cooling liquid being pressurized to a second predetermined pressure the magnitude of which during conditions of normal operation is less than the magnitude of said first pressure thereby defining a first predetermined pressure differential, first conduit means for communicating between said cooling liquid and said reactor assembly, and second conduit means for communicating between said steam generator and said cooling liquid, said first conduit means being effective to supply a flow of said cooling liquid to said reactor assembly whenever there is an accidential loss of said reactor coolant causing a reduction in the magnitude of said first pressure sufficient to attain a second predetermined pressure differential as between said cooling liquid and said reactor coolant within said reactor assembly, said second predetermined pressure differential having a magnitude less than said first predetermined pressure differential, said flow of said cooling liquid being directed to said reactor core to thereby replenish said accidental loss of said reactor coolant, said second conduit means being effective when a third predetermined pressure differential is attained between said cooling liquid and the steam within said steam generator for supplying comparatively high pressure steam to said cooling liquid to thereby provide a pumping force to said cooling liquid to completely fill that portion of the reactor assembly containing the fuel of said reactor core.

2. A safeguard system according to claim 1 wherein said cooling liquid is pressurized by associated pump means.

3. A safeguard system according to claim 1 wherein said reservoir of cooling liquid comprises at least one normally closed tank-like structure containing said cooling liquid, and wherein said cooling liquid comprises water with a neutron poison carried thereby.

4. A safeguard system according to claim 3 wherein said neutron poison is of such a concentration so that when said steam generator forces said cooling liquid out of said reservoir completely filling that portion of the reactor assembly containing the fuel of said reactor core the cooling fluid so filling that said portion of the reactor has the required and sufficient concentration of said neutron poison.

5. A safeguard system according to claim 3 and further comprising steam jet injector nozzles operatively communicating with said cooling liquid said first conduit means and said second conduit means whereby when communication is completed through said second conduit means the flow of steam therethrough and said jet injector nozzles causes a flow of said cooling liquid out of said tank-like structure and through said jet injector nozzles into said first conduit means.

6. A safeguard system according to claim 1 and further comprising third conduit means communicating between said reservoir and said steam generator, said third conduit means being effective when the pressure of the steam within said steam generator exceeds a predetermined design maximum pressure to vent such steam to said cooling liquid within said reservoir.

7. A safeguard system according to claim 6 and further comprising pressure responsive valve means effective for completing communication through said third conduit means when said steam pressure exceeds said predetermined design maximum pressure, said pressure responsive valve means being effective to prevent said communication through said third conduit means when said steam pressure does not exceed said predetermined design maximum pressure.

8. A safeguard system according to claim 1 and further comprising pressure responsive means effective for preventing flow of steam from said steam generator through said second conduit means to said reservoir until a pressure differential therebetween is attained equal to said third predetermined pressure differential.

9. A safeguard system according to claim 8 wherein said pressure responsive means comprises rupture disk means.

10. A safeguard system according to claim 6 and further comprising pressure responsive means effective for preventing flow of steam from said steam generator through said second conduit means to said reservoir until a pressure differential therebetween is attained equal to said third predetermined pressure differential.

11. A safeguard system according to claim 10 wherein said pressure responsive means comprises rupture disk means.

12. A safeguard system according to claim 1 and further comprising means for determining a maximum flow rate from said steam generator through said second conduit means to said reservoir, said means for determining said maximum flow rate comprising sonic orifice means in series with said second conduit means.

13. A safeguard system according to claim 6 and further comprising means for determining a maximum flow rate from said steam generator through said second conduit means to said reservoir, said means for determining said maximum flow rate comprising sonic orifice means in series with said second conduit means.

14. A safeguard system according to claim 1 wherein said cooling liquid within said reservoir is refrigerated to a low temperature but still maintaining its liquid state so as to thereby be capable of absorbing additional quantities of energy when directed to the environs of said portion of said reactor assembly.

15. A safeguard system according to claim 1 wherein said cooling liquid is de-airated so as to thereby remove substantially all of the free oxygen therefrom and thereby prevent the possibility of an oxygen supported hydrogen explosion when said cooling liquid is directed to the environs of said portion of said reactor assembly.

16. A safeguard system according to claim 1 and further comprising a second body of a second cooling liquid disposed generally within said containment structure, third conduit adapted for communication between said second cooling liquid and the interior of said containment structure, and pressure responsive means cooperating with said third conduit means for normally preventing flow of said second cooling liquid into said interior of said containment structure, said pressure responsive means being effective to complete said communication through said third conduit means whenever said interior of said containment structure attains a predetermined increased pressure arising out of said accidental loss of said reactor coolant into said interior of said containment structure, the said completion of said communication through said third conduit means enabling said second cooling liquid to absorb some of the heat energy of said accidentally lost reactor coolant and to flow into said interior of said containment structure and into heat exchanging relationship with said reactor assembly.

17. A safeguard system according to claim 16 wherein the respective volumes of said interior of said containment structure said reactor assembly said first mentioned cooling liquid and said second cooling liquid are such as to cause said interior of said containment structure to be at a pressure less than atmospheric pressure once said first mentioned cooling liquid and said second cooling liquid have been directed to the environs of said reactor assembly.

18. A safeguard system according to claim 1 wherein said reservoir comprises a plurality of spaced tank structures each of which is filled with said cooling liquid, and further comprising an additional quantity of steam generators collectively referred to with said at least one steam generator as a plurality of steam generators, wherein said first conduit means interconnect respective ones of all of said plurality of spaced tank structures and said reactor assembly, and wherein said second conduit means interconnect respective ones of said plurality of steam generators to respective ones of said plurality of spaced tank structures.

19. A safeguard system according to claim 18 wherein said reactor assembly comprises inlet means and outlet means for the normal flow of said reactor coolant therethrough, and wherein said first conduit means are operatively connected to both said inlet means and said outlet means.

20. In a nuclear reactor power plant comprising a reactor assembly, reactor assembly coolant system means comprising reactor coolant conduit means, high-pressure high temperature reactor coolant circulated within said reactor coolant system, steam generator means, and a containment structure sealingly enclosing at least said reactor assembly and said reactor coolant system means, the method of affecting containment of said reactor power plant during accidental loss of said reactor coolant from said reactor coolant system means, said method comprising the steps of sensing the occurrence of said accidental loss of said reactor coolant by means of the occurrence of a first preselected pressure differential between said reactor coolant within said reactor coolant system and a first separate body of pressurized cooling liquid, causing said cooling liquid to start to flow to and into said reactor coolant system means and in so doing reducing the pressure magnitude of said pressurized cooling liquid, sensing the decreasing pressure magnitude of said pressurized cooling liquid until a second preselected pressure differential is attained between said pressurized cooling liquid and the steam within said steam generator means, and causing said steam to be directed to said pressurized cooling liquid when said second preselected pressure differential is attained to thereby provide an additional pumping force to said cooling liquid to thereby continue said flow of said cooling liquid to and into said reactor coolant systems means in order to thereby replenish such of said reactor coolant as has been lost due to the occurence of said accidental loss of said reactor coolant.

21. A method according to claim 20 and further comprising the step of chilling said pressurized cooling liquid prior to the attainment of said first preselected pressure differential.

22. A method according to claim 20 and further comprising the steps of permitting such reactor coolant as is lost during said accidental loss of reactor coolant to vaporize within said containment structure so as to cause the interior of said containment structure to attain a first relatively high vapor pressure, sensing the attainment of a third selected pressure differential occurring between said interior of said containment structure and a second separate body of second cooling liquid when said first relatively high vapor pressure is attained, then completing communication between vapor at said relatively high vapor pressure and said second cooling liquid to thereby heat and simultaneously pressurize said second cooling liquid, and permitting said second cooling liquid to flood said interior of said containment structure when the total effective pressure head of said second coolinq liquid exceeds the existing magnitude of said vapor within said containment structure.

* * * * *

UNITED STATES PATENT AND TRADEMARK OFFICE
CERTIFICATE OF CORRECTION

PATENT NO. : 3,865,688
DATED : February 11, 1975
INVENTOR(S) : Frank W. Kleimola It is certified that error appears in the above—identified patent and that said Letters Patent is hereby corrected as shown below:

Column 4, line 3, after "radio-nuclide" add quotation marks about the word: getters;

Column 4, line 21, after "tanks" add quotation marks about the hyphenated word: water-logged;

Column 4, line 64, "convention" should read -- convection --.
Column 4, line 65, "convention" should read -- convection --.
Column 5, line 9, "convention" should read -- convection --.
Column 7, line 52, after "subjected" cancel "into" and substitute therefor -- unto --.
Column 8, line 56, after "container" "provids" should read -- provides --.

Column 10, line 5, "spary" should read -- spray --.
Column 13, line 48, "periods" should read -- period --.
Column 13, line 51, after "includes" "area" should read -- areas --.

UNITED STATES PATENT AND TRADEMARK OFFICE
CERTIFICATE OF CORRECTION

PATENT NO. : 3,865,688
DATED : February 11, 1975
INVENTOR(S) : Frank W. Kleimola It is certified that error appears in the above—identified patent and that said Letters Patent is hereby corrected as shown below:

Column 22, line 28, after "eliminate" "and" should read -- any --.

Column 23, line 15, "pressurevolume" should read -- pressure-volume --.

Signed and Sealed this

Fifth Day of February 1980

[SEAL]

Attest:

Attesting Officer

SIDNEY A. DIAMOND

Commissioner of Patents and Trademarks